(12) United States Patent
Grepper

(10) Patent No.: US 10,415,868 B2
(45) Date of Patent: Sep. 17, 2019

(54) COOLER HAVING INTEGRATED BLENDER AND ACCESSORIES

(71) Applicant: Ryan Grepper, Portland, OR (US)

(72) Inventor: Ryan Grepper, Portland, OR (US)

( * ) Notice: Subject to any disclaimer, the term of this patent is extended or adjusted under 35 U.S.C. 154(b) by 0 days.

(21) Appl. No.: 15/984,265

(22) Filed: May 18, 2018

(65) Prior Publication Data

US 2018/0266747 A1 Sep. 20, 2018

Related U.S. Application Data

(63) Continuation of application No. 14/530,541, filed on Oct. 31, 2014, now Pat. No. 9,976,789.

(Continued)

(51) Int. Cl.
*F25D 3/08* (2006.01)
*A47J 43/07* (2006.01)

(Continued)

(52) U.S. Cl.
CPC .................. *F25D 3/08* (2013.01); *A45C 5/14* (2013.01); *A45C 11/20* (2013.01); *A47J 43/046* (2013.01); *A47J 43/0722* (2013.01); *A47J 43/085* (2013.01); *B01F 7/0025* (2013.01); *B01F 7/162* (2013.01); *B01F 13/0018* (2013.01); *B01F 15/00519* (2013.01); *B01F 15/00538* (2013.01); *B65D 51/24* (2013.01); *B65D 81/3813* (2013.01); *B65D 81/3816* (2013.01); *F25D 23/00* (2013.01); *F25D 23/12* (2013.01);

(Continued)

(58) Field of Classification Search
CPC .......... B01F 15/00538; B01F 13/0018; B01F 7/162; B01F 7/0025; A47J 43/085; A47J 43/046; B65D 81/3816; B65D 81/3813; B65D 51/24; F25D 3/08; F25D 23/12; F25D 23/00; A45C 11/20; H02J 7/0047
See application file for complete search history.

(56) References Cited

U.S. PATENT DOCUMENTS 2,289,645 A    7/1942  Geistert
2,658,355 A *  11/1953 Katzenberger .......... A23G 9/12
                                                220/592.09

(Continued)

OTHER PUBLICATIONS

Lemke, April Fools: Hilarity From the Outdoors World, Apr. 1, 2015; Internet Archive, WayBack Machine, accessed Jul. 12, 2015 at https://web.archive.org/web/20150712215945/https://gearjunkie.com/april-fools-2015-roundup; 6 pgs.

*Primary Examiner* — Tony G Soohoo
(74) *Attorney, Agent, or Firm* — Miller Nash Graham & Dunn LLP

(57) ABSTRACT

A portable cooler includes an insulated body that defines a main interior storage space, and a lid structured to at least partially cover the main interior storage space. The lid includes an integrated blender or an integrated blender drive. Components of the blender may include a source of electrical power, an electric motor, and a blender spindle mounted through a surface of the lid and coupled to the electric motor. The integrated blender may also include a blender jar structured to hold food items for blending and one or more blending blades. The lid may further include a blender recess shaped in a negative mold of a collar of the blender jar to prevent the blender jar from rotating during operation.

18 Claims, 32 Drawing Sheets

Related U.S. Application Data

(60) Provisional application No. 61/898,344, filed on Oct. 31, 2013.

(51) Int. Cl.

| | | |
|---|---|---|
| *A47J 43/08* | (2006.01) | |
| *B01F 7/00* | (2006.01) | |
| *B01F 15/00* | (2006.01) | |
| *B01F 7/16* | (2006.01) | |
| *B01F 13/00* | (2006.01) | |
| *B65D 51/24* | (2006.01) | |
| *F25D 23/00* | (2006.01) | |
| *B65D 81/38* | (2006.01) | |
| *H02J 7/00* | (2006.01) | |
| *A47J 43/046* | (2006.01) | |
| *A45C 11/20* | (2006.01) | |
| *F25D 23/12* | (2006.01) | |
| *A45C 5/14* | (2006.01) | |

(52) U.S. Cl.
CPC .......... *H02J 7/0047* (2013.01); *H02J 7/0063* (2013.01); *F25D 2303/081* (2013.01); *F25D 2400/38* (2013.01); *H02J 2007/0067* (2013.01)

(56) References Cited

U.S. PATENT DOCUMENTS

| | | | |
|---|---|---|---|
| 3,943,421 A | 3/1976 | Shibata et al. | |
| 4,487,509 A | 12/1984 | Boyce | |
| 4,489,505 A | 12/1984 | Hench et al. | |
| 4,887,909 A | 12/1989 | Bennett | |
| 4,892,413 A * | 1/1990 | Vats .................... | A47J 43/0716 181/200 |
| 5,353,697 A | 10/1994 | Venturati et al. | |
| 5,380,086 A | 1/1995 | Dickson | |
| 5,432,306 A | 7/1995 | Pfordresher | |
| 5,639,161 A | 6/1997 | Sirianni | |
| 5,855,431 A | 1/1999 | Costanzo | |
| 5,938,329 A | 8/1999 | Reeder | |
| 5,957,577 A * | 9/1999 | Dickson .................. | A47J 43/07 366/197 |
| 6,112,899 A | 9/2000 | Zeringue | |
| 6,571,908 B2 | 6/2003 | Bohannon et al. | |
| 6,616,324 B1 * | 9/2003 | Planca .................... | A47J 43/06 241/101.2 |
| 6,629,492 B1 | 10/2003 | Li | |
| 6,672,757 B2 | 1/2004 | Hallett, Jr. | |
| 7,780,034 B1 | 8/2010 | Richardson | |
| 7,798,886 B1 | 9/2010 | Williamson | |
| 8,087,603 B2 | 1/2012 | Kolar et al. | |
| 8,096,143 B1 | 1/2012 | White et al. | |
| 8,777,045 B2 | 7/2014 | Mitchell et al. | |
| 9,297,568 B1 | 3/2016 | Thompson | |
| 9,419,356 B2 | 8/2016 | Copper et al. | |
| 9,448,000 B2 | 9/2016 | Patsis et al. | |
| 2002/0089894 A1 | 7/2002 | Parlor, Sr. | |
| 2002/0095947 A1 | 7/2002 | Treppedi et al. | |
| 2004/0026946 A1 | 2/2004 | Reed, III et al. | |
| 2004/0093892 A1 | 5/2004 | Abfalter | |
| 2005/0254341 A1 | 11/2005 | Gerling et al. | |
| 2005/0263527 A1 | 12/2005 | Maldonado et al. | |
| 2008/0022712 A1 | 1/2008 | Carr | |
| 2008/0245793 A1 | 10/2008 | Hanson et al. | |
| 2009/0095459 A1 | 4/2009 | Williams et al. | |
| 2009/0217699 A1 | 9/2009 | Ball | |
| 2010/0107893 A1 | 5/2010 | Goodrick-Meech | |
| 2010/0126196 A1 | 5/2010 | McCane | |
| 2012/0048149 A1 | 3/2012 | Pendleton | |
| 2012/0318177 A1 | 12/2012 | Piazza, Jr. | |
| 2014/0038731 A1 | 2/2014 | Manner et al. | |
| 2014/0054299 A1 | 2/2014 | Kamin et al. | |
| 2015/0114024 A1 | 4/2015 | Grepper | |
| 2015/0267956 A1 | 9/2015 | Miller | |

\* cited by examiner

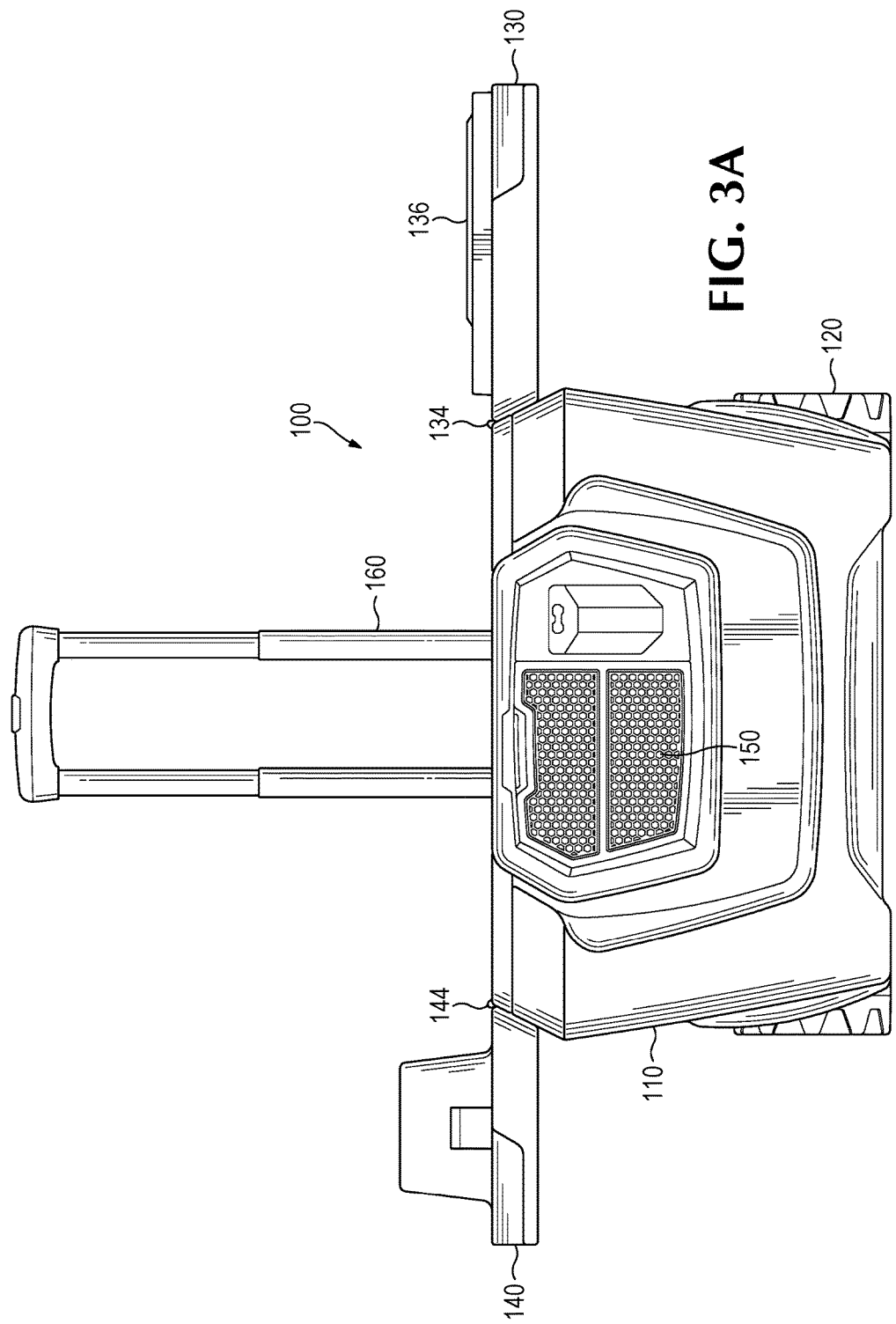

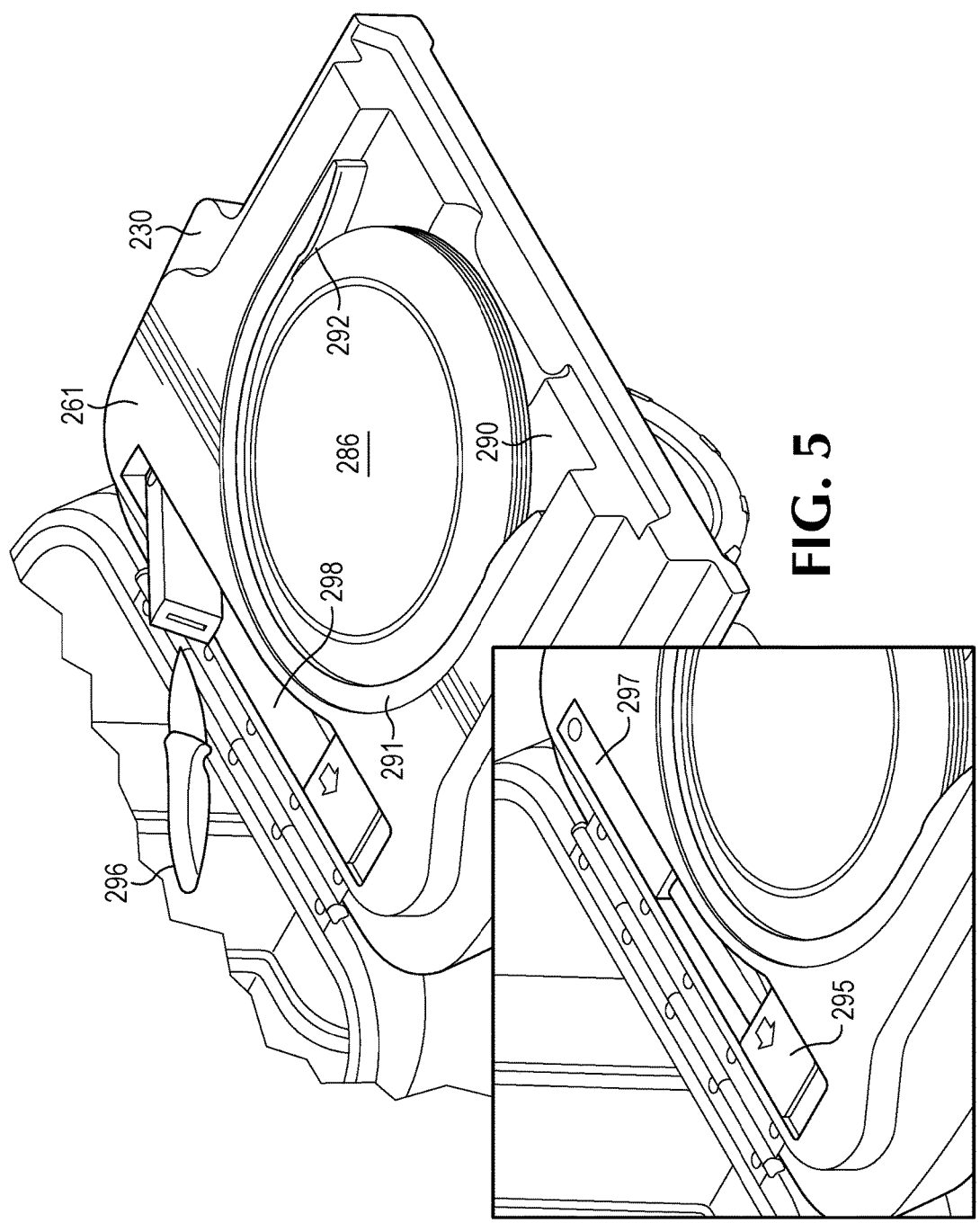

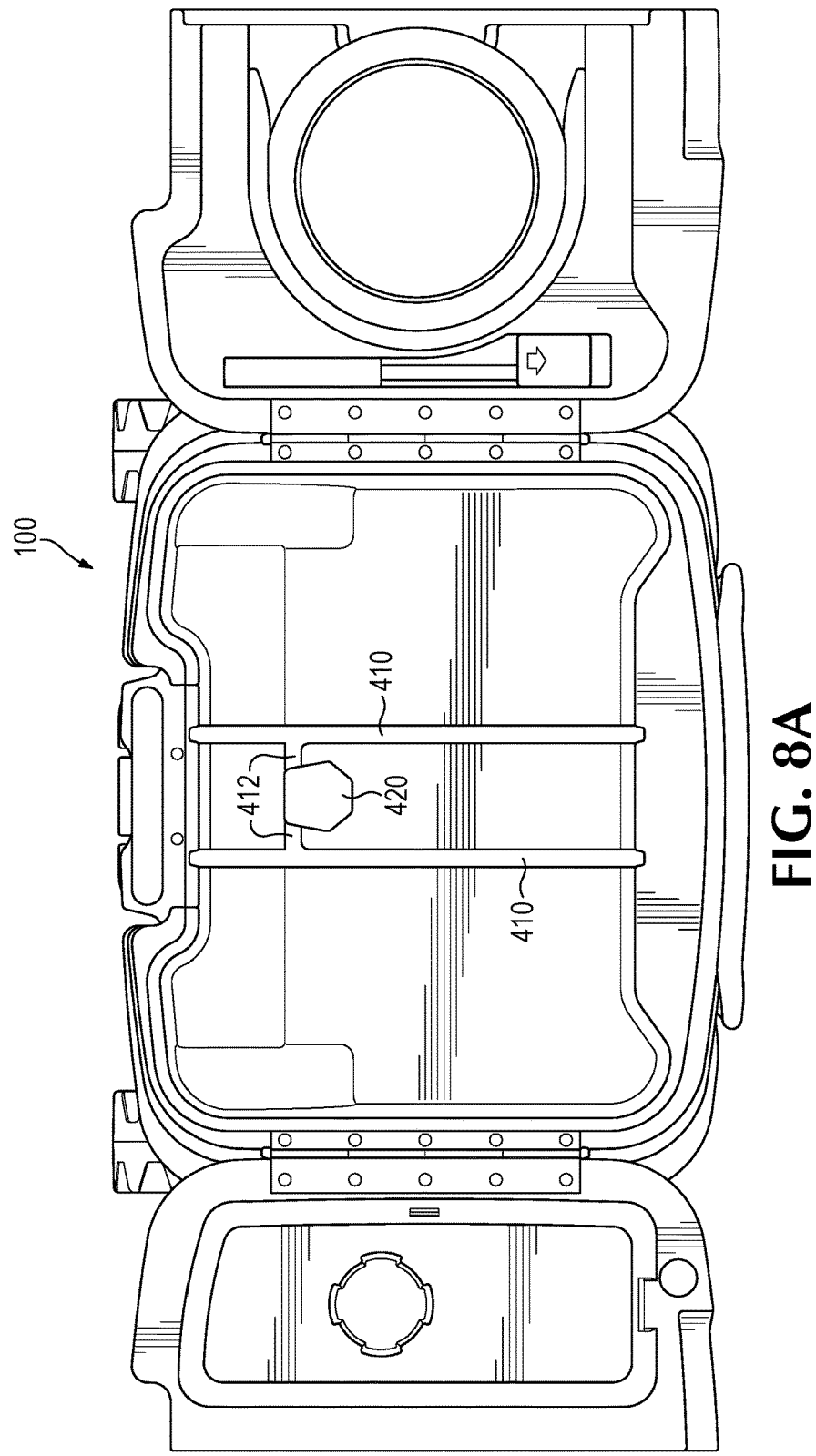

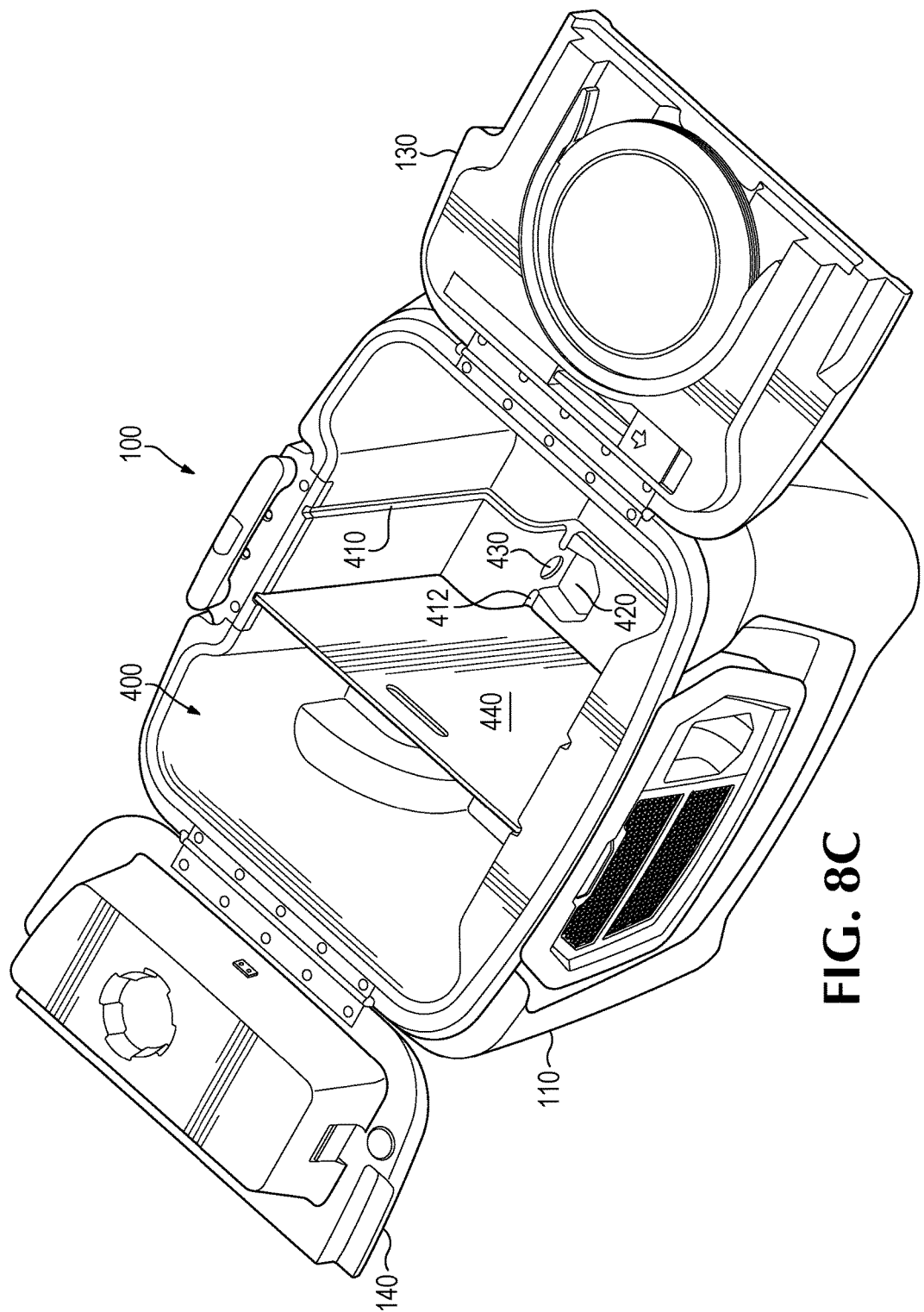

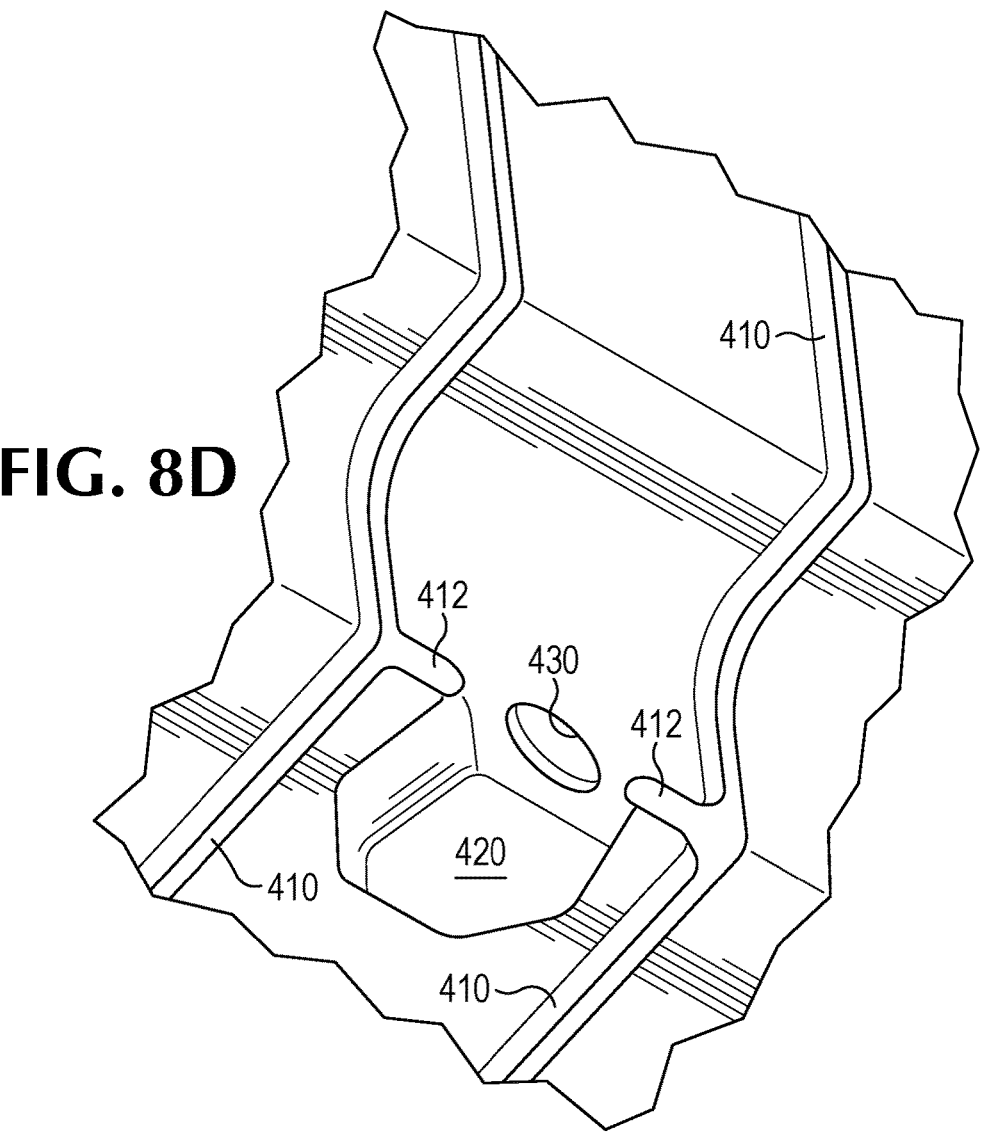

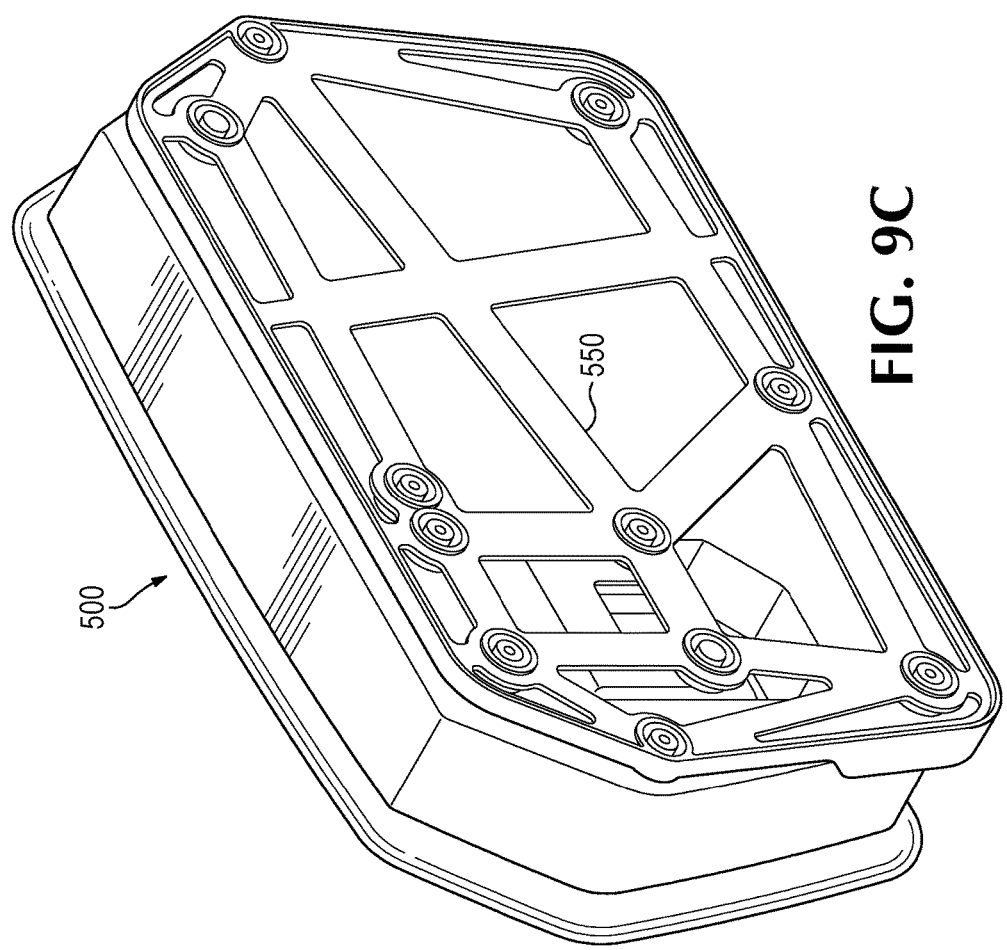

COOLER HAVING INTEGRATED BLENDER AND ACCESSORIES

CROSS REFERENCE TO RELATED APPLICATIONS

This application is a continuation of and claims priority to co-pending U.S. patent application Ser. No. 14/530,541, titled "COOLER HAVING INTEGRATED BLENDER AND ACCESSORIES" and filed on Oct. 31, 2014, which claimed benefit from and is a non-provisional of U.S. Provisional Application 61/898,344, filed Oct. 31, 2013, entitled ICE CHEST WITH INTEGRATED BLENDER, the contents of which are incorporated by reference herein.

This application is related to U.S. patent application Ser. No. 14/530,543, titled "DRAG MINIMIZING COOLER" and filed on Oct. 31, 2014, and to U.S. patent application Ser. No. 14/530,551, titled "LID STRUCTURE FOR COOLER" and filed on Oct. 31, 2014, and to U.S. patent application Ser. No. 14/530,563, titled "COOLER HAVING INTEGRATED ACCESSORY STORAGE" and filed on Oct. 31, 2014, and to U.S. patent application Ser. No. 14/530,577, titled "COOLER DRAIN" and filed on Oct. 31, 2014, and to U.S. patent application Ser. No. 14/530,591, titled "COOLER WITH INTEGRATED PLATE STORAGE" and filed on Oct. 31, 2014, and to U.S. patent application Ser. No. 14/530,602, titled "COOLER HAVING BATTERY CHARGING SYSTEM" and filed on Oct. 31, 2014, all of which are commonly assigned with this application and are hereby fully incorporated by reference herein.

FIELD OF THE INVENTION

This disclosure is directed to a cooler with an integrated blender and more specifically relates to a cooler or ice chest with an integrated blender and other accessories to create a unified product.

BACKGROUND

Present coolers or ice chests come in a variety of shapes and sizes. Coolers, generally, are formed with an insulated shell around a hollow cavity or storage section to store items desired to be kept cool. Items to be kept cool are placed along with a cold source, typically ice or cold packs, within the storage section. Coolers are generally portable and include handles for lifting. Some coolers include integrated wheels to facilitate transport.

A problem exists in that, once loaded, present coolers are very hard to move. Coolers without wheels must be carried, and items stored within the storage section add to the weight of the cooler itself to become a large, heavy, bulky apparatus. For many outings, a cooler is only one part of the gear carried to the destination. For some destinations the cooler may simply be placed in a car or truck and driven to the destination. Some destinations, however, like a beach, park, remote campsite or boat, do not typically provide an easy way to transport a cooler in a vehicle to the final destination, so the cooler must be carried or dragged. Coolers with wheels often suffer from poor design, construction, or material choice and are a constant source of frustration. Wheels that may properly operate on the flat, level floor of a store tend to sink in soft ground, such as sand or a forest trail. Loading a cooler with heavy items exacerbates the problem.

Further, a cooler may only be one of a number of items desired at the destination. Many people enjoy comforts brought from home when at a destination, such as chairs, blankets, and sporting devices such as Frisbees and paddleballs. Transporting such items may be difficult, especially when traveling with small children who cannot carry heavy, bulky, or a multitude of items.

Another limitation of present coolers is that they only store pre-made drinks, and therefore limit the types of drinks that may be enjoyed at the destination.

Embodiments of the invention address these and other issues in the prior art.

SUMMARY OF THE DISCLOSURE

Aspects of the invention are directed to a portable cooler, including an insulated body defining a main interior storage space and a lid structured to at least partially cover the main interior storage space and having an integrated blender or an integrated blender drive.

In other aspects, the integrated blender may include a source of electrical power, an electric motor coupled to the source of electrical power, a blender spindle mounted through a surface of the lid and coupled to the electric motor. The integrated blender may also include a blender jar structured to hold food items for blending and one or more blending blades disposed at a bottom of an inside of the blender jar that are structured to engage with the blender spindle.

In some aspects, the portable cooler may include a blender recess shaped in a negative mold of a collar of the blender jar. In some aspects the portable blender includes a lockout switch within the blender recess. In some embodiments the lid of the portable cooler may include one or two recesses.

The electrical power in the cooler may be a battery and the motor is a DC electric motor coupled to the battery. Some embodiments may include a switch or safety switch.

In some aspects the electric motor is directly coupled to the blender spindle, while in other aspects the motor and spindle are both connected to a transmission.

Other aspects of the invention include a portable cooler that includes an insulated body including a main interior and a lid that at least partially covers the main interior. The lid may include a battery receiver for receiving a battery through an access door and storing it within, a DC electric motor that can be coupled to such a battery and a blender spindle connected to the electric motor, or connected through a transmission to the electric motor.

In some aspects the invention is directed toward a lid for a portable cooler that includes a motor coupled to a blender drive and a power source for the motor.

Other aspects include a portable blender that has a storage container structured to contain ice and a storage container lid for at least partially covering the storage container. In such aspects, the storage container lid includes a DC electrical source, a DC motor coupled to the electrical source, a blender spindle coupled to the DC motor and structured to spin when the DC motor spins, a blender jar structured to hold food items for blending, and one or more blending blades disposed at a bottom of an inside of the blender jar and structured to engage with the blender spindle.

Yet other aspects of the invention include an electrical network for a portable cooler contained within a lid of the portable cooler. Such an electrical network may include an energy source; a motor coupled to the energy source; a motor switch coupled between the energy source and the motor and structured to selectively cause an electrical circuit to be formed between the motor and the energy source to spin the motor; a light source coupled to the energy source; a light switch coupled between the energy source and the light source and structured to selectively cause an electrical circuit to be formed between the light source and the energy source to illuminate the light source.

In some embodiments, the energy source of the electrical network is a rechargeable battery, which also may include an indicator to generate a signal indicative of a state of charge of the rechargeable battery.

Other aspects of the electrical network include a recharging port coupled to the energy source for charging a device separate from the portable cooler from the energy source of the portable cooler through the recharging port.

BRIEF DESCRIPTION OF THE DRAWINGS

FIGS. 3A, and 3B are front views illustrating operation of lids of the cooler illustrated in FIGS. 1A and 1B.

FIG. 5 is a perspective view of a top lid for use with the cooler illustrated in FIGS. 1A and 1B.

FIGS. 8A and 8B are a top view and perspective view illustrating an interior space of the cooler illustrated in FIGS. 1A and 1B according to embodiments of the invention.

FIG. 8C is a perspective view of the interior space illustrated in FIGS. 8A and 8B further including illustration of an integrated cutting board according to embodiments of the invention.

FIG. 8D is a perspective view of the interior space illustrated in FIGS. 8A and 8B showing additional detail according to embodiments of the invention.

FIGS. 9A, 9B, and 9C are perspective views of an accessory storage unit built in or attached to the cooler illustrated in FIGS. 1A and 1B.

DETAILED DESCRIPTION

Figure 1A:
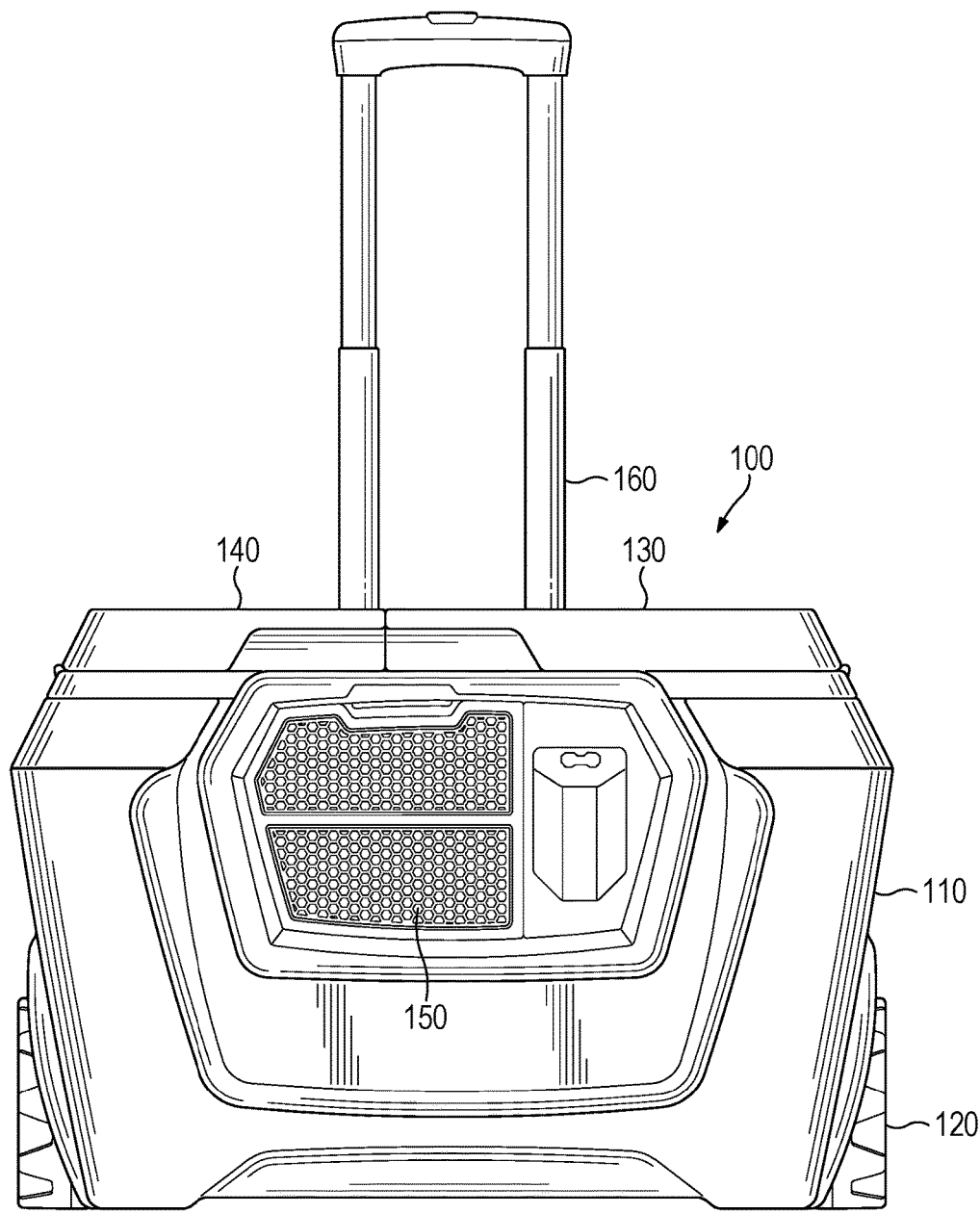
FIGS. 1A and 1B are front and perspective views, respectively, of a cooler including an integrated blender and other accessories according to embodiments of the invention.
Figure 1B:
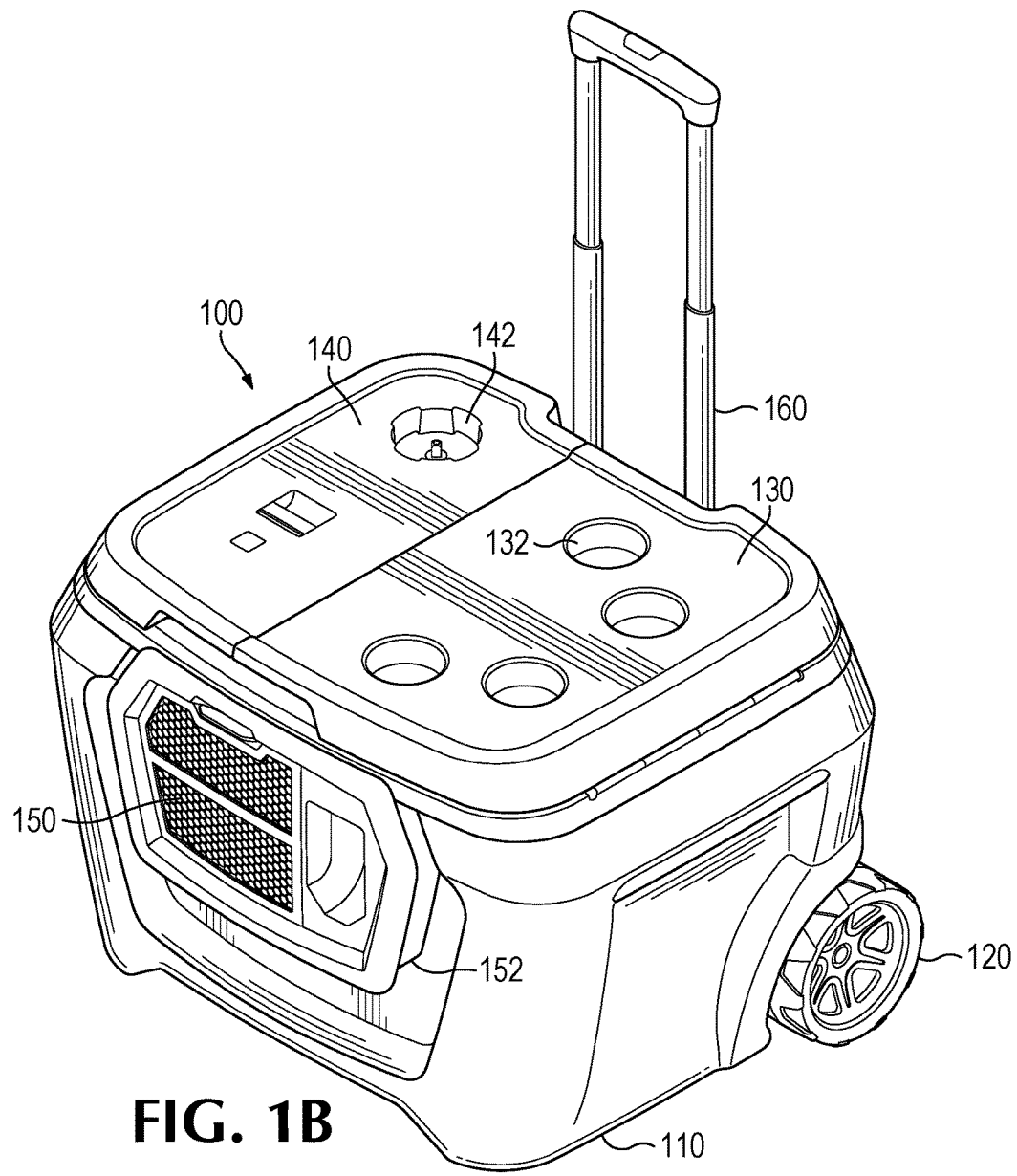

Turning now descriptively to the drawings, in which similar reference characters denote similar elements throughout the several views, FIG. 1A is a front view of a cooler 100 according to embodiments of the invention. FIG. 1B is a perspective view of the cooler 100. In general, in this embodiment, the cooler 100 includes a cooler body 110, one or more wheels 120, a first and second lid 130, 140, an accessory housing unit 150, and a handle 160. Each of these items is described in detail below.

The cooler 100 is an insulated storage area in which food or beverage items may be stored and transported while remaining cold. A cooler body 110 is preferably generally rectangular in shape, although the cooler body may also be square, polyangular, circular, or ovaloid depending on the implementation. The cooler body 110 is preferably made of a durable plastic, such as High-Density Polyethylene, Poly-Propylene, Acrylonitrile Butadiene Styrene (ABS) plastic or other plastic material, and includes an outer shell and inner shell. The inner shell is formed from food-grad plastic. Insulation material such as polyurethane or polystyrene foam fills a void formed between the inner and outer shells, as described in more detail below. In some embodiments the outer shell may be formed of a pliable material, such as nylon fabric. In yet other exemplary embodiments, the exterior shell can include a combination of hard material, such as plastic, and a pliable material, such as nylon fabric. Although described herein as being preferably made of plastic, some embodiments may use metal or other materials for the cooler body 110.

In some embodiments the outer shell of the cooler body 110 may be blow molded, but may also be injection molded, thermoformed, roto-molded, or formed using other commercially known methods. In some embodiments the cooler 100 is generally rectangular, with a width that is between 10 and 40 inches wide, a depth between 10 and 20 inches, and a height between 5 and 30. Other embodiments may include different dimensions. In one embodiment the outer shell of the cooler body 110 is 0.008 inches thick. The outer shell of the cooler body 110 may be colored, and may include UV inhibitors integrated within the plastic or applied to the surface to maintain the color.

Figure 2A:
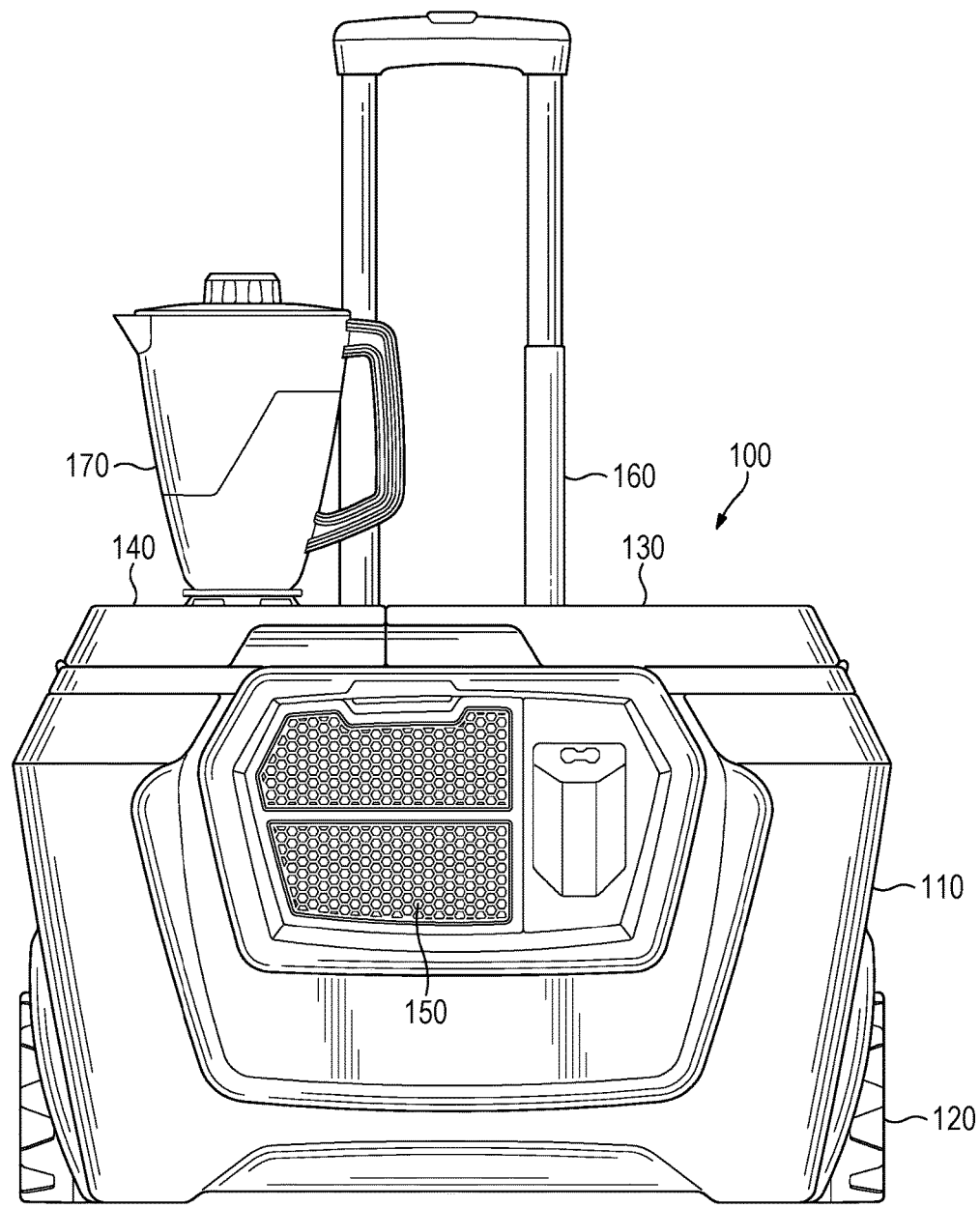
FIGS. 2A and 2B are front and perspective views, respectively, of the cooler of FIGS. 1A and 1B illustrating the integrated blender mounted thereon.
Figure 2B:
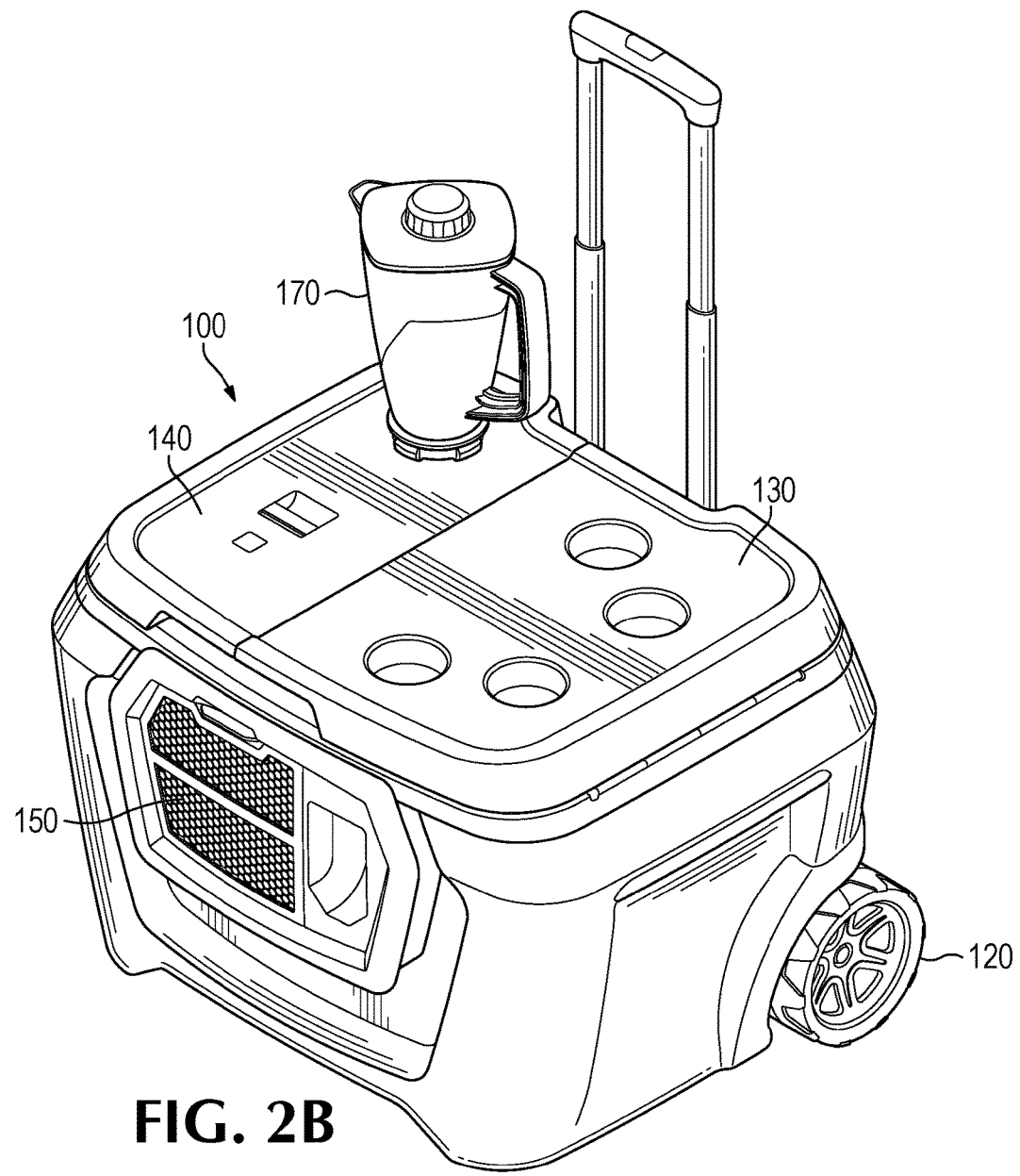

FIGS. 2A and 2B illustrate the cooler 100 of FIGS. 1A and 1B having a blender 170 mounted thereon. As described in more detail below, in some embodiments the blender 170 is matingly received by a blender recess 142 (FIG. 1B) formed within the second lid 140. Although preferably a base of the jar of the blender 170 and the blender recess 142 are formed to engage or mate with one another to hold the blender 170 in a fixed relationship, other methods of securing the blender to the cooler 100 are possible. In some embodiments the recess 142 is a negative impression of the geometry of the bottom of the jar of the blender 170 so that when the blender jar is inserted into the blender recess, the shapes interfere with one another to prevent rotation of the blender jar. Integration of the blender 170 with the cooler 100 is described below.

Figure 3B:
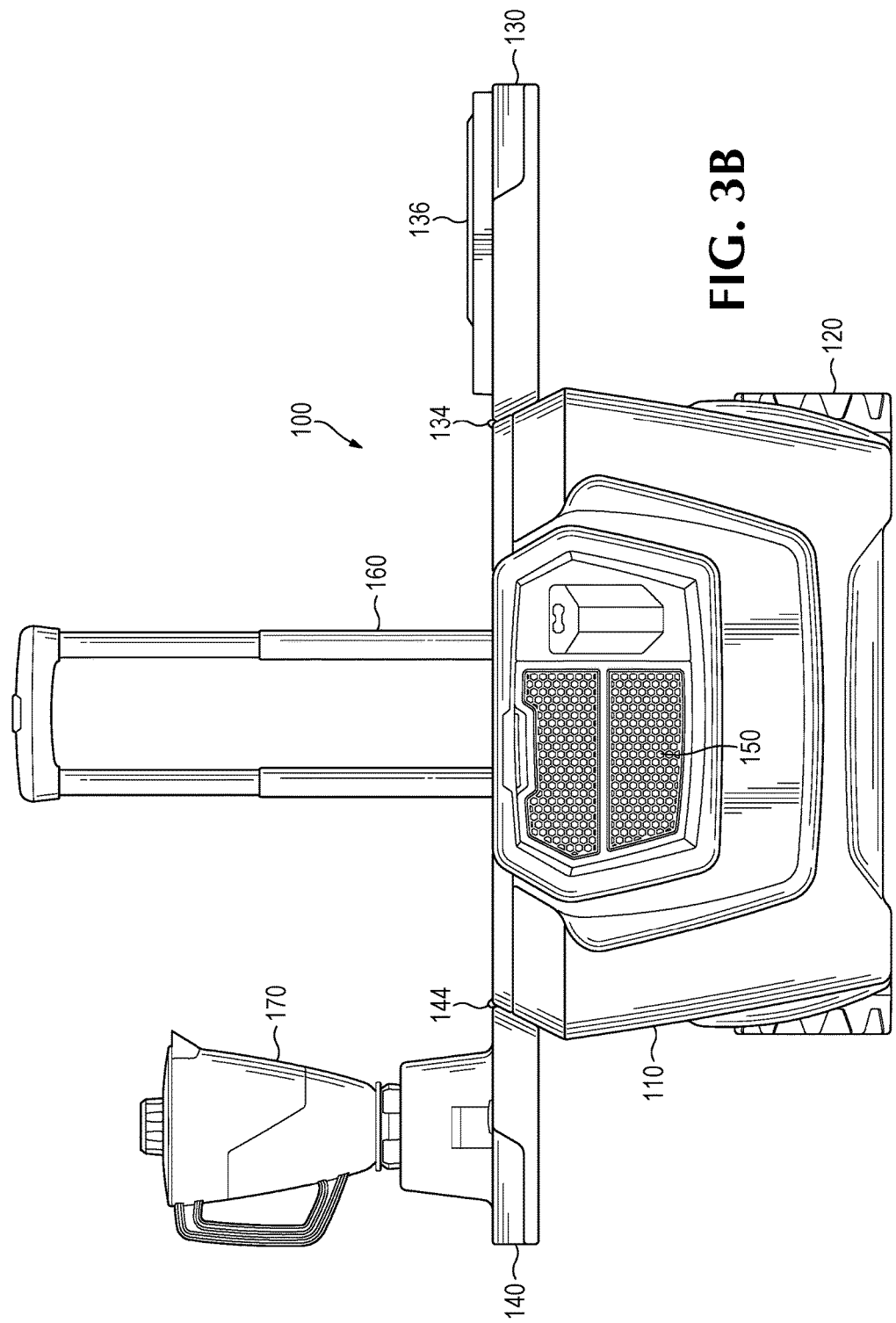
Figure 3C:
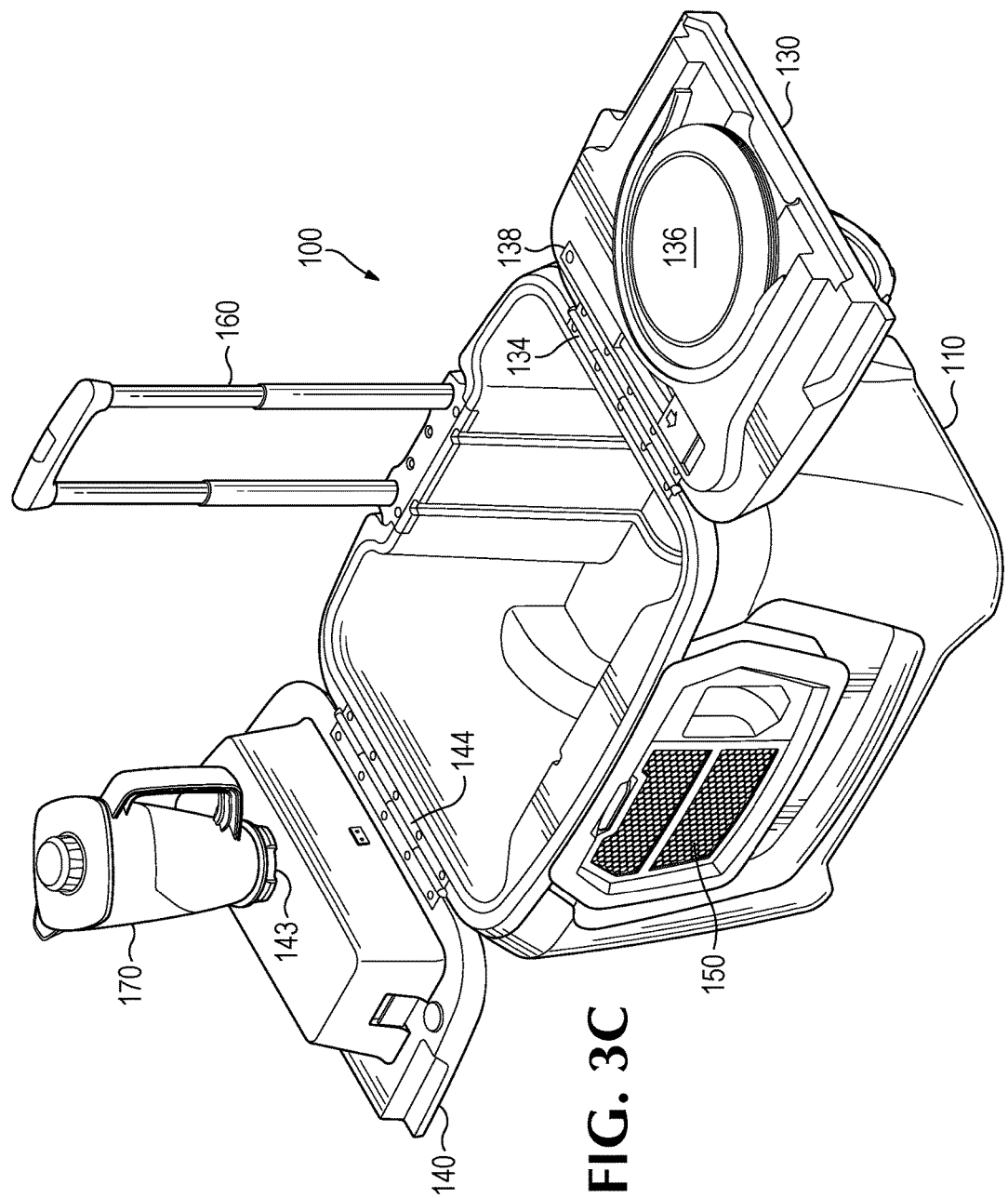
FIG. 3C is a perspective view illustrating operation of lids of the cooler illustrated in FIGS. 1A and 1B.

FIGS. 3A, 3B, and 3C illustrate operation of the first and second lids 130, 140 of the cooler 100. Either or both of the lids 130, 140 may attach to the cooler 100 through a hinge. For example, the first lid 130 may be attached to the cooler 100 by a hinge 134, and the second lid 140 may be attached to the cooler 100 by a hinge 144. Either or both of the hinges 134 may be formed of metal or plastic, for example. Preferably the hinges 134, 144 are durable and piano-style hinges formed of stainless steel. The hinges 134, 144 are preferably screwed to the cooler body 110, but may be mounted using other means, such as glues or other adhesives, either solely or in combination with other mounting methods, such as screws, rivets, etc. The hinges may be partially or fully covered in plastic or other material to prevent interference with sharp edges of the hinge. In one embodiment plastic bumpers are mounted to the lid or cooler body to cover the ends or edges of the hinges. The hinges 134, 144 allow rotational or pivoting movement of their respective lids 130, 140 to allow access to the interior portion of the cooler body. In other embodiments, the lid or lids are not permanently affixed to the cooler body 110, but instead, can be slidably removed and applied onto or into the cooler body. In this embodiment, the lid typically has an interference or snap-in fit with the cooler body.

In other embodiments the lid or lids 130, 140 may not be physically attached to the cooler body 110 at all, and may instead include recesses either in the lid or the cooler body to structurally receive the lid and maintain it in a relatively fixed relationship to the cooler body, but can be separated when desired. In yet other embodiments the lids are removably attached to the cooler body, and include a catch or latch attached to either the lid or to the cooler body. Operation of the catch or latch allows the lid to separate from the cooler body or be selectively secured to the body.

The lids 130, 140 can be made of a hard material, a soft material, such as nylon fabric, or a combination thereof and can have a number of shapes. For example the lids may be formed of injection molded plastic, such as ABS plastic. The lid or lids 130, 140 may include a rubber or foam gasket for further insulating the contents of the cooler 100, or may be formed from a combination of materials. In the preferred embodiment, the first lid 130 functions to open and close access to the contents of the cooler body 110, to provide an insulated barrier to maintain a desired temperature within the cooler body, and to retain or enclose one or more plates 136 and one or more knives 134, as described in more detail below. Further, in the preferred embodiment, the second lid 140 functions to open and close access to the contents of the cooler body 110, to provide an insulated barrier to maintain a desired temperature within the cooler body, and to retain or enclose the blender elements, such as a motor, a transmission such as a gearbox or pulleys, a drive spindle, a battery and an operation switch. Other components may be stored or disposed within the second lid 140 as well.

FIGS. 3A, 3B, and 3C each show the lids 130, 140 as fully opened. When fully opened, the lids 130, 140 extend from the cooler body 110 and form a horizontal surface. As illustrated in FIG. 3B, the blender 170 may be stored within another blender recess 143 on the inside surface of the second lid 140 that is structured to accept the base of the jar of the blender 170. In other words, the blender recesses 142 and 143 may have the same shape on opposing sides of the second lid 140, so that the blender may be stored in a working position when the second lid 140 is closed, and stored in a storage position when the lid is opened. In other embodiments the blender 170 may be temporarily stored on the inside of the second lid 140 in a blender recess 143 that has a different shape than the blender recess 142. For example, the blender recess 143 may merely be circular in shape, and not formed to prevent the jar of the blender 170 to rotate as would the blender recess 142. In other embodiments, the blender recess 143 may not be a recess at all, and may instead be a protuberance or projection sized and shaped to engage the bottom of the jar of the blender to hold the blender in place when the second lid 140 is open.

Figure 4A:
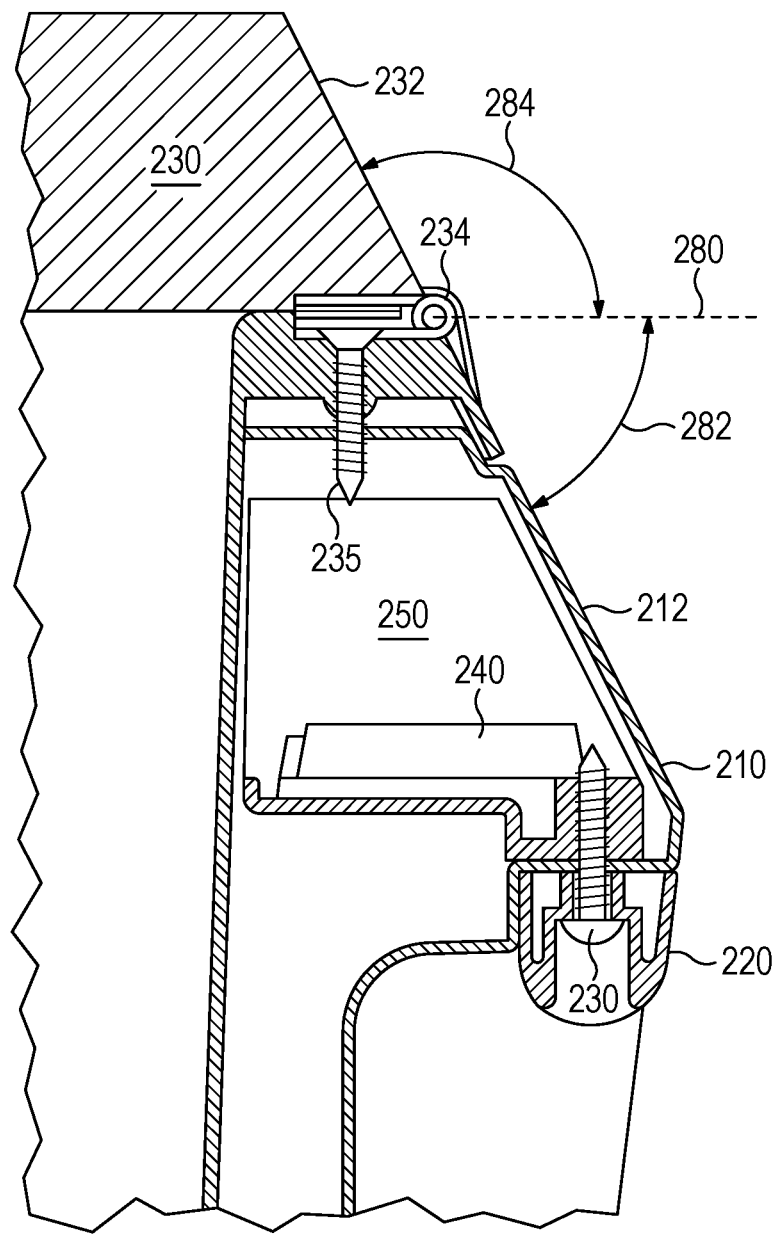
FIGS. 4A and 4B are front and perspective views illustrating additional detail of the lids of the cooler illustrated in FIGS. 1A and 1B.
Figure 4B:
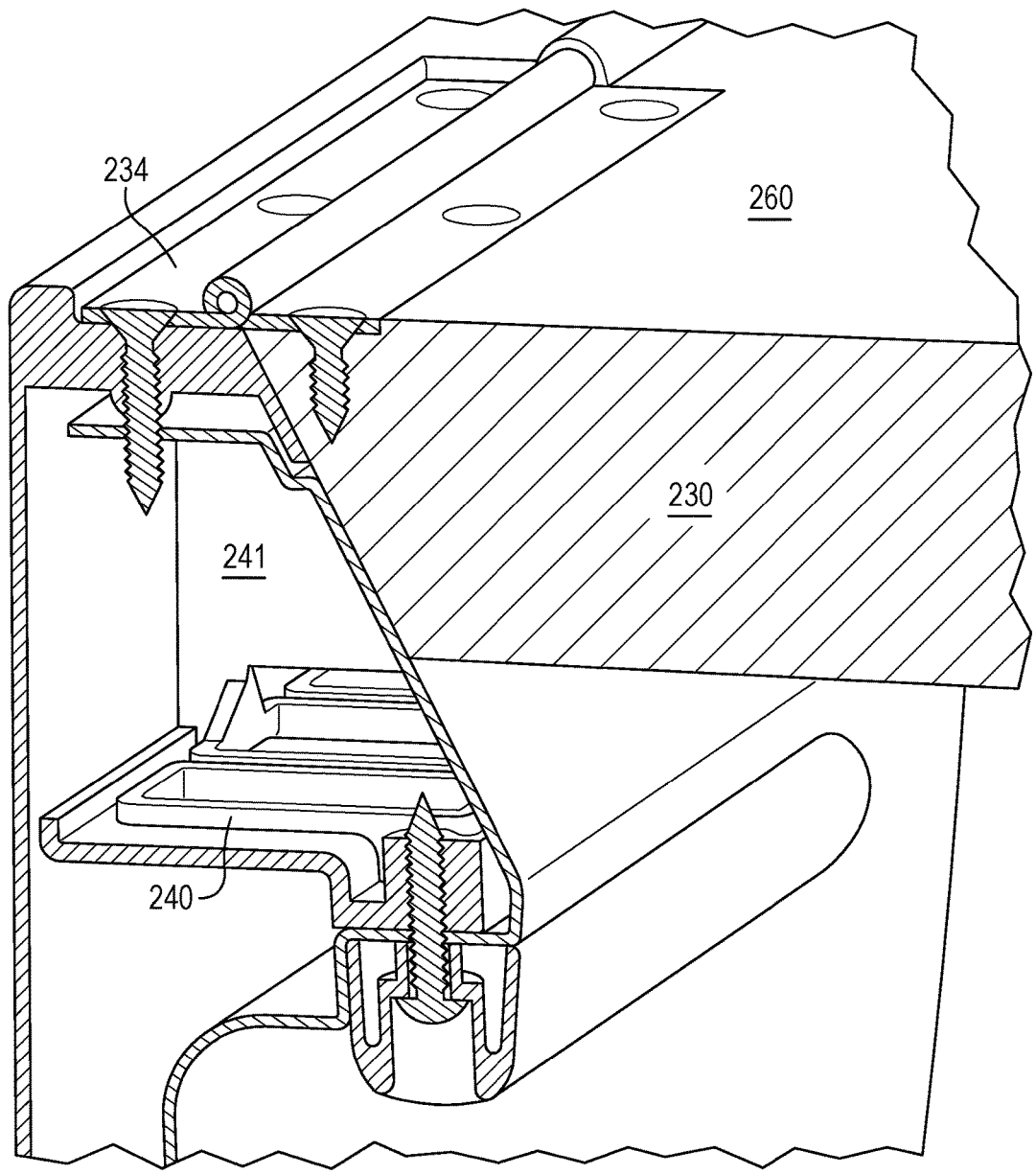

FIGS. 4A and 4B are front and front perspective views, respectively, showing additional detail of how the first lid 130 may be mounted to the cooler 100 of FIG. 1A, as well as its operation, according to embodiments of the invention.

A lid 230 may be an example of the first lid 130 illustrated in FIGS. 3A, 3B, and 3C. In this embodiment the lid 230 is secured to a body 210 of the cooler by a piano hinge 234 held in place by an attachment mechanism, such as one or more screws 235. An integrated handle 220 is also attached to the body 210 of the cooler by an attachment mechanism, such as one or more screws 230. This particular structure of the integrated handle 220 allows the body 210 to be blow molded, or otherwise produced by a mold while including an undercut, integrated handle 220 for the cooler. FIG. 4B shows the lid 230 in its fully opened position. Recall from above that the lid 230, when fully opened, forms a horizontal surface 260 with respect to the body of the cooler. In some embodiments, a mating side surface 212 of the body 210 of the cooler is angled to match a mating side surface 232 of the lid 230. For example, the mating side surface 232 of the lid 230 may have an angle 284 approximately 110° to a top surface 280 of the cooler, while the mating side surface 212 of the body 210 has an angle of approximately 70° to the top surface 280. The actual angles chosen for implementation may vary depending on implementation details, however preferred embodiments include angles of the lid and cooler body that are supplementary angles, i.e., the angles of the adjoining sides add to 180°, so that the surface 260 of the lid 230 creates a generally horizontal surface when the lid 230 is fully opened. The same may be true of the second lid 140.

The structure of the embodiment illustrated in FIGS. 4A and 4B also allow the hinge 234 to be mounted within the outside surface 210 of the cooler. In other words, if the lid 230 and outside surface 210 of the cooler had straight (i.e., 90°) sides, then, to fully open the lid 230 would require the hinge 234 to be mounted at the absolute outside edge of the cooler, which could expose the hinge 234 to being damaged through use. Because the hinge 234 is recessed from the outside edge of the cooler in embodiments of the invention, such damage is prevented in those embodiments. For those embodiments that have 90° sides, the exposed hinge may include extra protection, such as a plastic covering or a hardened surface covering the exposed hinge.

A support structure including one or more lateral supports 240 and one or more vertical supports 241 is included within the body of the cooler, as illustrated in FIGS. 4A and 4B. The support structure may be formed of high density plastic or other material structured to provide mechanical support. Such supports prevent the weight of the lid 230, or the weight of items stacked on the lid 230 or forces otherwise applied to the lid 230 from denting or crushing the sides of the cooler. In other words, the lateral and vertical supports 240, 241 prevent deformation of the outside surface 210 of the cooler. This is especially important when the lid 230 is relatively long, which provides mechanical advantage to the crushing force. During production of the cooler, the lateral and vertical supports 240, 241 may additionally be surrounded by or integrated with foam insulation, which gives additional mechanical structure to the lateral and vertical supports 240, 241, to withstand the force of the lid as it is meets the side of the cooler while being open. The lateral and vertical supports 240, 241, with or without the addition of further foam insulation, also provide a surface to which the securing screws 230, 235 may be mounted.

A top surface of the first lid 130 may include recesses for holding drinks, as illustrated in FIG. 1B. Additionally, as illustrated in FIG. 5, an inside surface 261 of the first lid 130, 230, may accommodate one or more accessories, such as one or more plates 286 and one or more knives 296. The surface 261 may be shaped to accommodate the plates 286, such as in an indentation 290. The indentation 290 is uniquely shaped having a partially circular end and an opposite open end. The indentation 290 may be for example, between approximately 0.25 and 1.25 inches deep, and preferably approximately 0.75 inches deep, and may include an inclined surface that is angled or beveled with respect to the top surface 261. The depth of the indentation 290 created by the inclined surface is sized and shaped to accommodate the plates 286. Although four plates 286 are illustrated in FIG. 5, the depth of the indentation 290 may be more deep or more shallow to accommodate any number of plates 286. A groove 291 may be placed within the indentation 290 and sized to mechanically hold edges of the plates 286 in place. In other embodiments the groove may further incorporate a friction edge to increase the friction against the plates 286 to hold them in place. For example the friction edge may be made of rubber or silicone. In other embodiments the friction edge or a portion of the groove 291 is removable to provide access to the plates 286, and a user would remove the friction edge or top portion of the groove to remove the plates vertically, one at a time or in a group, and then re-install the friction edge or top portion of the groove after the plates have been returned to the indentation 290.

Further, the plates 286 may be shaped to nest in a group, such as by including a series of projections on an individual plate that mechanically sit within one or more mating recesses of another plate. In such a way the plates 286 may be removed or inserted as a group, but also could be removed or inserted individually. Additionally, the indentation 290 may include a retaining member 292 to help retain the plates 286 within the indentation. For example the retaining member 292 could be a molded projection within the indentation 290. To remove one or any number of the plates 286, the user would grab the desired number from the stack of plates 286 and pull them past the retaining member 292, which would deform slightly to allow the plates to become free. In other embodiments the retaining member 292 is a movable assembly having an attached edge and a free edge. The free edge could be urged toward the center of the indentation 290 by a spring (not illustrated). Then, moving the stack of plates 286 could be extracted by pulling the plates toward the open end of the indentation 290 and overcoming the spring force of the retaining member 292 to remove the plates. The same action is made when returning the plates 286 to the indentation 290.

The first lid 130, 230 may additionally include a recessed knife store 298. The store may include a safety latch 295 that must be slid or otherwise operated to gain access to the knife 296. A pivoting sheath 297 could store the sharp edge of the knife 296 to cover the exposed blade and prevent accidental injuries. Further, the sheath 297 could include a retaining mechanism, such as a two-sided pinch-lock (not illustrated) to retain the knife 296 in place. In such an embodiment the knife 296 is extracted by first sliding the safety latch 295 to gain access to the handle of the knife 296. Then, the user removes the knife 296 by pressing the pinch lock while simultaneously pulling the knife away from the sheath 297. In other embodiments the retaining mechanism of the sheath 297 could merely be a projection or indentation that mat-ingly snaps the knife 296 into place, to be stored, but allows the knife to be withdrawn and re-inserted with a sufficient amount of force.

Referring back to, for example, FIG. 3C, recall that the first lid 130 included storage for plates and knives, while the second lid 140 houses the blender and other accessories, as is now described in detail.

Figure 6A:
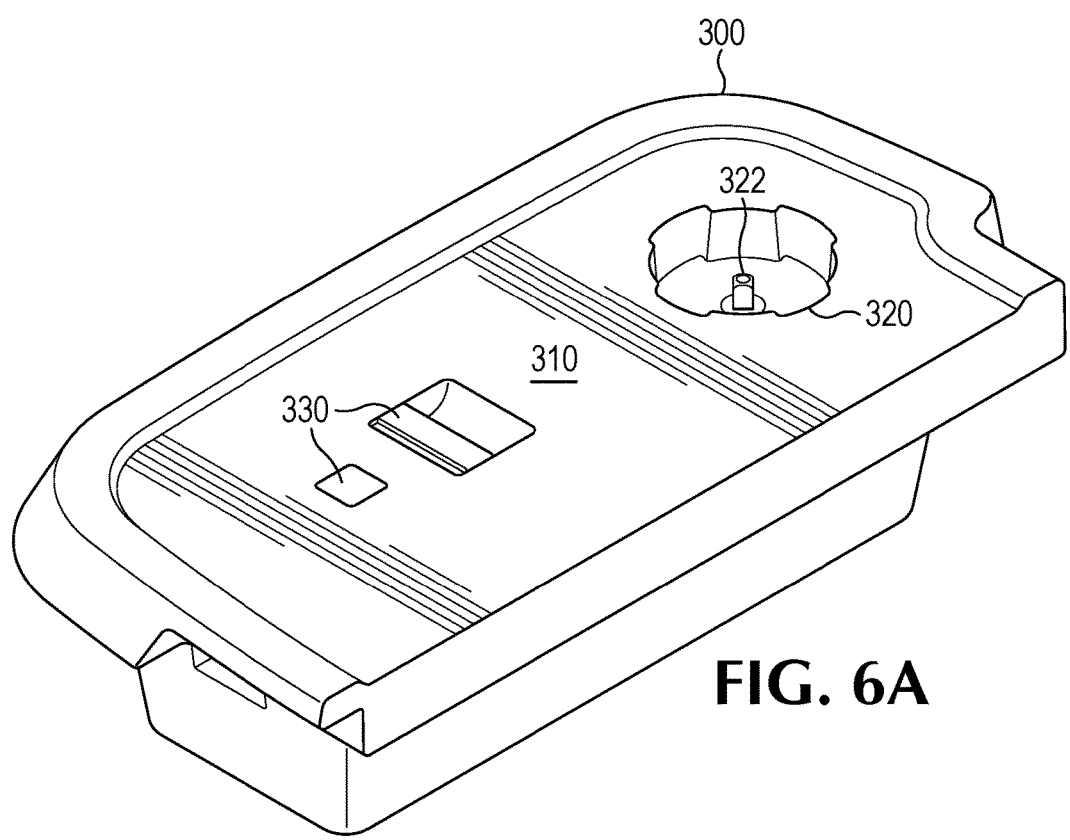
FIGS. 6A and 6B are perspective views of a top surface and bottom surface, respectively, of the second lid of the cooler illustrated in FIGS. 1A and 1B.
Figure 6B:
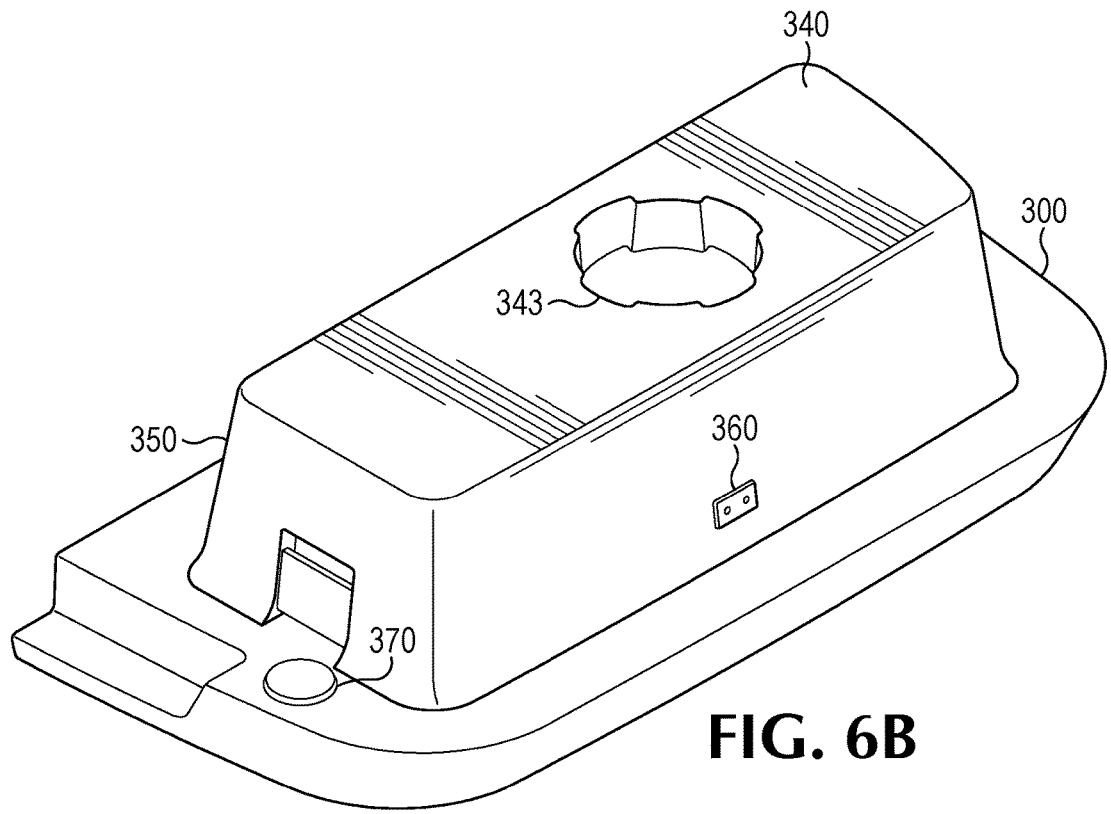
Figure 6C:
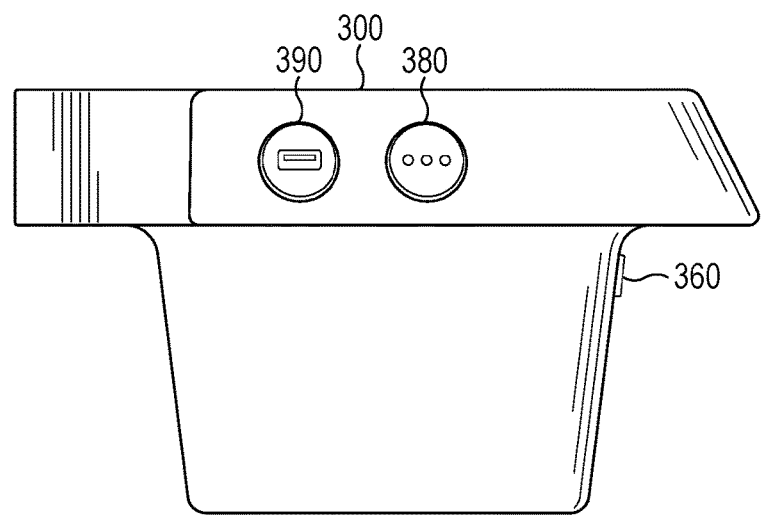
FIG. 6C is an end view of the second lid of the cooler illustrated in FIGS. 1A and 1B including additional features according to embodiments of the invention.

FIG. 6A is a perspective view of a top surface of the second lid, while FIG. 6B is a perspective view of a bottom surface of the second lid. FIG. 6C is an end view of the second lid illustrating an integrated charging port and a battery status indicator. A lid 300 illustrated in FIGS. 6A, 6B and 6C may be an example embodiment of the second lid 140 illustrated in FIGS. 3A, 3B, and 3C. The lid 300 of the embodiment illustrated in these figures includes a top surface 310, into which a blender receiver or recess 320 is formed. As described above, the blender recess 320 is sized to matingly receive the jar of the integrated blender and hold it in place during operation. The blender is operated by a rotating spindle 322. One or more switches 330 control operation of the blender. In some embodiments, as shown below, the blender is battery powered by a battery stored within the lid 300. The battery may be accessed through an access door 350, illustrated in FIG. 6B, which illustrates the underside of the lid 300. The access door 350 is preferably gasket sealed or otherwise water-tight.

A light, such as an LED light 360 is integrated into the lid 300 and controlled by a switch 370. In some embodiments the switch 370 controls a timed circuit, so that when the switch 370 is pressed, the light 360 will remain illuminated for a set period of time before turning off, such as 5 to 60 seconds, and preferably 30 seconds. In other embodiments the switch 370 may be a momentary switch, so that the light 360 remains illuminated so long as the switch 370 remains actuated, such as by pressing the momentary switch. As illustrated in FIG. 3C, the lid 300 is attached to the cooler body by a hinge so that the lid pivots or rotates about the hinge. Since the light 360 is integrated to the lid 300, rotating the lid 300 also controls the direction of where the light 360 is pointing. In some embodiments, it may be necessary to rotate the lid while controlling the operation of the light 360 so that the light illuminates the interior of the cooler. In some embodiments only a single LED bulb is necessary to be included in the light 360 for adequate illumination, especially when the inner shell of the cooler is lightly colored, such as white, grey, or beige, for example. In other embodiments the light 360 may include any number of separate light sources. It is preferable that the light 360 and switch 370 are water resistant or waterproof.

FIG. 6B also illustrates an inner blender recess 343 formed within the underside 340 of the lid 300. As described above, the inner blender recess 343 is sized and shaped to retain the jar of the blender. Note the lack of a spindle in the blender recess 343 compared to the presence of the spindle 322 in the blender recess 320 illustrated in FIG. 6A. Therefore, in the illustrated embodiment, the blender is operational only when the second lid 300 is place in a closed position, i.e., it is covering at least a portion of the storage section of the cooler. In other embodiments, however, the spindle 322 may be present within the blender recess 343 of the underside 340 of the second lid 300, and may not be present in the blender recess 320 of the top surface 310 of the lid 300. In such an embodiment the blender is operational only when the second lid 300 is placed in an opened position. In yet other embodiments a spindle may be present in both of the blender recesses 320 and 343 on both the upper and inside surfaces of the second lid 300. This embodiment allows the user to operate the blender regardless of the position of the second lid 300.

FIG. 6C is an end view of the second lid 300. An indicator 380 displays the charged state of the internal battery. The charging state may be indicated by a number of indicator lights illuminated, for example more lights illuminated indicate a greater charge. In other embodiments one or more indicator lights may change colors, for example, from green to red when the battery is discharging or discharged. Many variants are possible. A charging port 390 provides battery power for charging rechargeable devices from the internal battery. In some embodiments the charging port 390 may be a Universal Serial Bus (USB) charging port, or other popular charging port for electrical devices. In some embodiments the charging port 390 may be a universal port that provides charging access from the internal battery to any of a number of types of charge ports. For example, the charging port 390 may facilitate use of a number of particularized port attachments that may individually electrically and/or electrically and mechanically connect to the charging port 390. For instance, one particularized port attachment may be a USB port attachment that attaches to and makes electrical contact with the charging port 390. Another particularized port attachment may be an LIGHTNING port. To charge a USB device, the user inserts the USB port attachment into the charging port 390, then connects the device to be charged to the USB port attachment. To instead charge a LIGHTNING device, the user removes the USB port attachment from the charging port 390 and instead inserts the LIGHTNING port attachment into the charging port 390. Then the user connects the LIGHTNING device to the LIGHTNING port attachment. Different port attachments, in addition to being physically different, may also be electrically different. For example, various port attachments may include voltage matching, such as a voltage limiter, to reduce the voltage of the internal battery to the recommended charging voltage. Although the device to be charged may be plugged directly into the charging port 390 or to an accessory port coupled to the charging port, electrically access may also be communicated through a cord that has the appropriate ports on both ends. In such an example, the cooler 100 may include a single charging port 390, and further include a number of different electrical cords that are compatible with the charging port 390 that connect to particular charging ports on various devices. Such devices may include a music player, speaker, phone, camera, GPS, gaming device, rechargeable flashlight, etc. Once the device to be charge is electrically connected to the internal battery, then charge from the internal battery is transferred from the internal battery to the device to be charged.

In some embodiments the charging port 390 is not limited to being a charging port, but could also include a power socket to provide direct access to the battery within the cooler. In such an embodiment the power socket could be used to provide access to the battery within the cooler to run, for example, a plug-in electric air pump for inflating beach balls or water flotation devices. The charging port 390 could be fitted with or coupled to a cigarette-lighter style plug for wide compatibility.

Both the indicator 380 and charging port 390 are water resistant or even waterproof. In some embodiments the charging port 390 includes a waterproof cap, which may be secured to the charging port. The waterproof cap keeps the charging port 390 waterproof so long as the cap is in place.

Figure 7A:
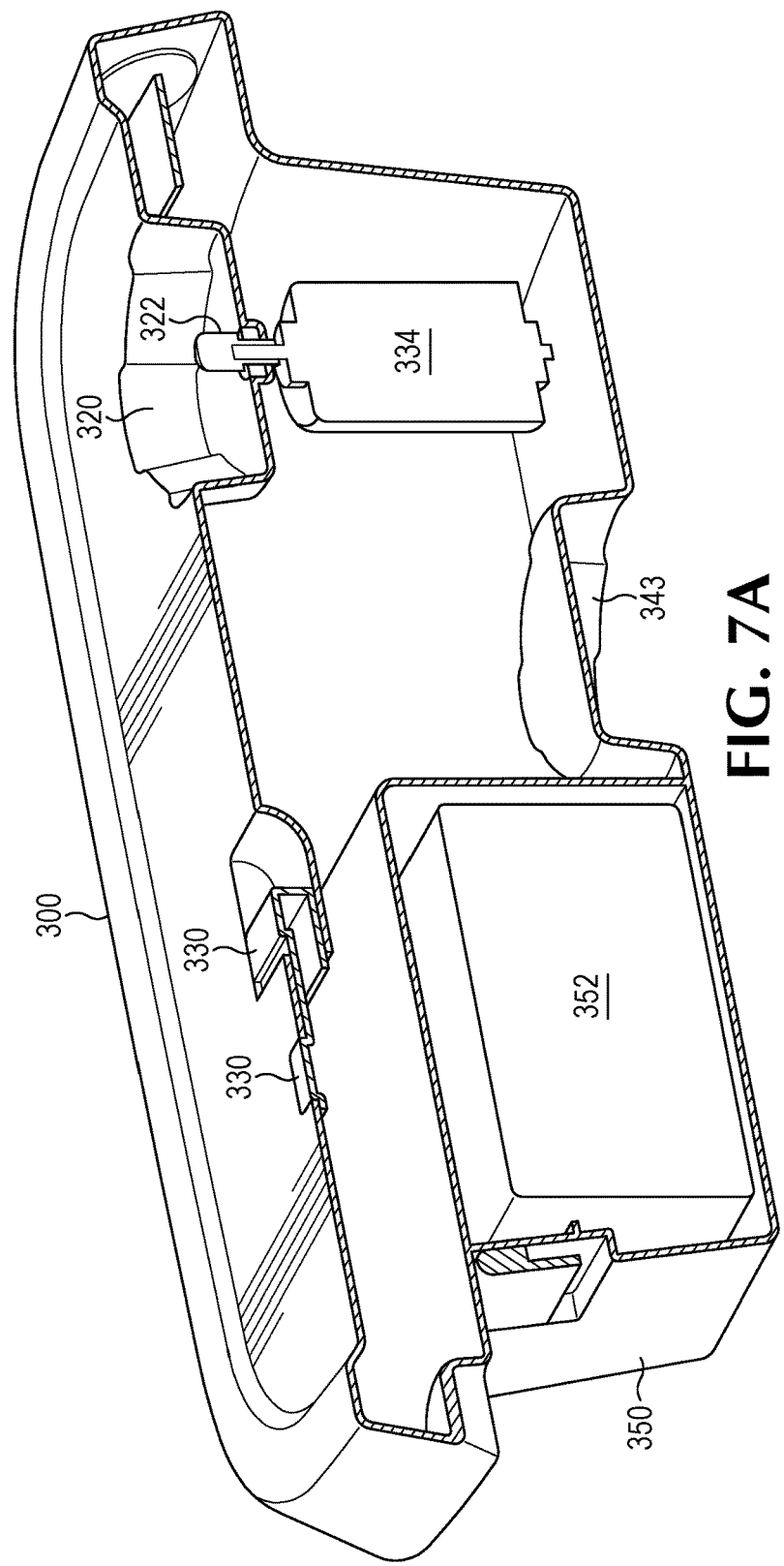
FIGS. 7A, 7B, and 7C are cross-sectional views of the second lid of the cooler illustrated in FIGS. 1A and 1B illustrating various internal components and controls.
Figure 7B:
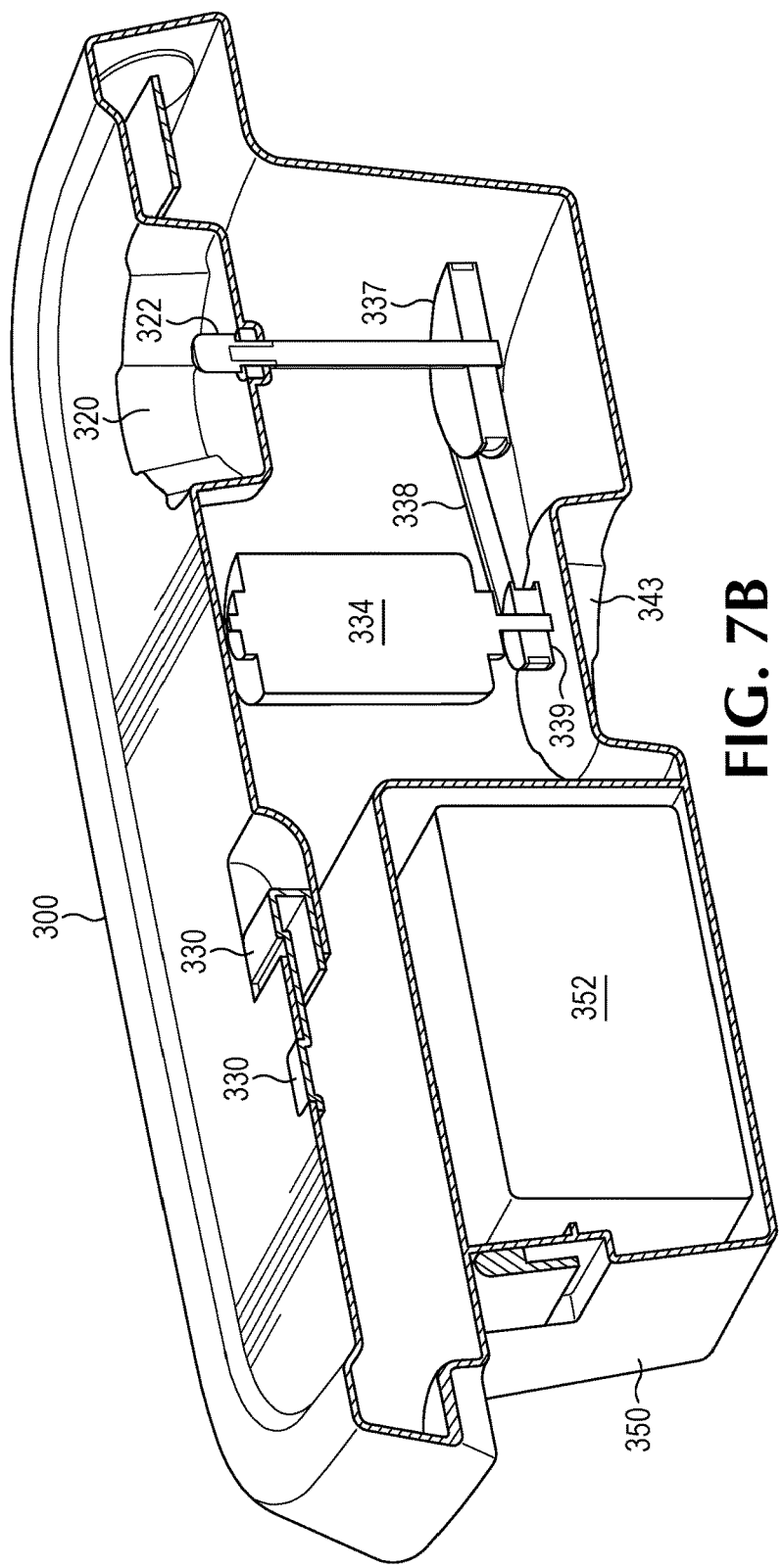
Figure 7C:
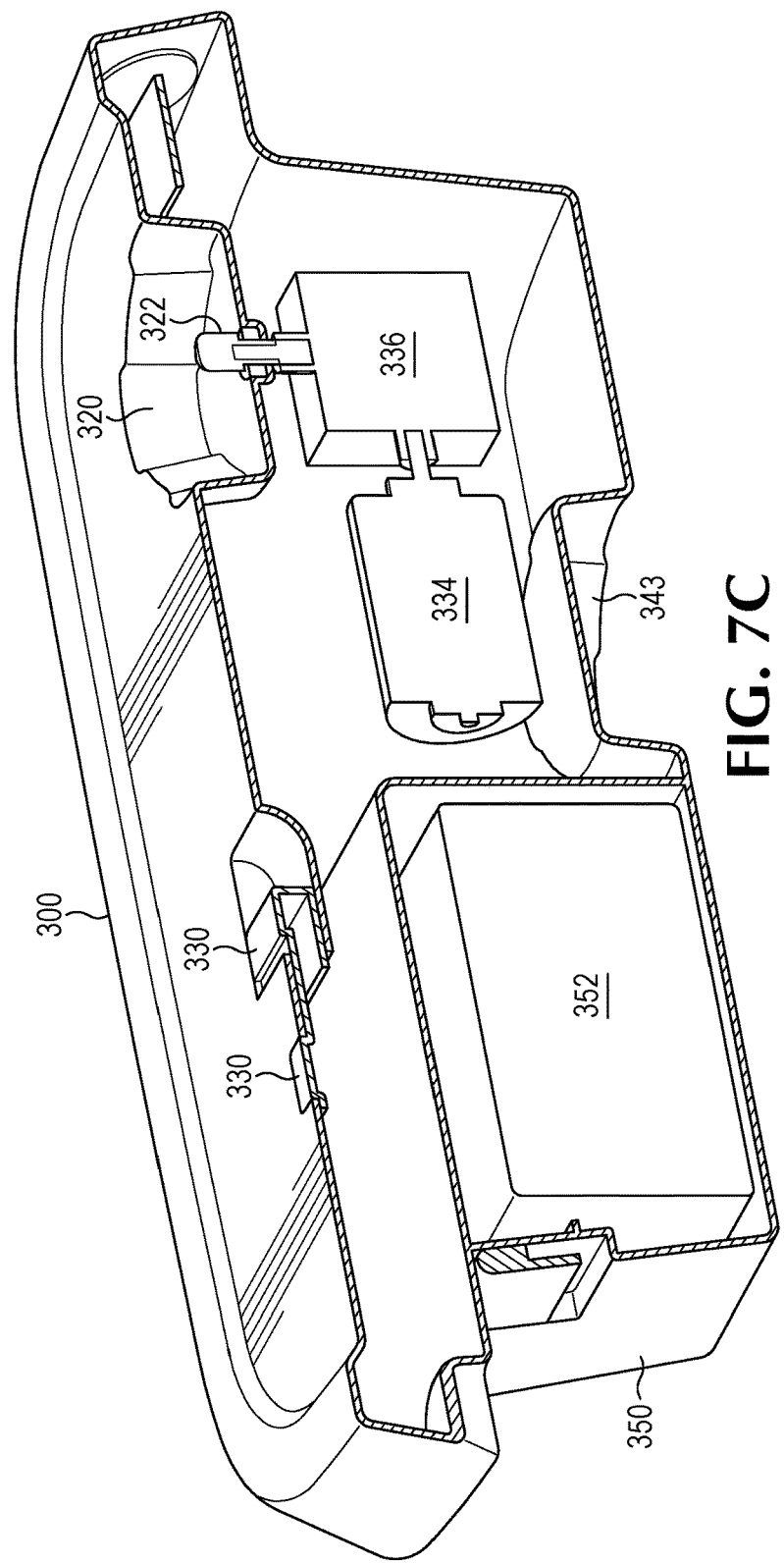

FIGS. 7A, 7B, and 7C are cross-sectional views of the second lid 300 illustrating various internal components and controls.

The internal components of the second lid 300 of this embodiment includes a battery 352, a motor 334, a motor control switch 330, and various options to transfer power from the motor to the spindle 322, such as through a transmission. The spindle 322 is mounted to the underside of the blender recess 320 with a bushing, such as a pre-impregnated bronze bushing. In other embodiments the spindle 322 may include one or more bearing surfaces to reduce the rotational drag, such as roller bearings. In general, in operation, the user places a jar of a blender (not illustrated in FIG. 7A, 7B, or 7C) within the blender recess 320 where the blender then engages the spindle 322. The user operates the control switch 330, which may be a two-part switch. A two-part switch reduces the chances that the blender is unintentionally operated. In a two-part switch, both parts of the switch are operated simultaneously. In the illustrated two-part switch, a first portion is rotatably raised with a first hand while the second portion is simultaneously pressed with the second hand. This action completes the electrical circuit between the battery 352 and the motor 334 and causes the motor to spin. In the embodiment illustrated in FIG. 7A, the spindle 322 is directly attached to a rotating portion of the motor 334. In other words, when the rotator of the motor 334 spins, the spindle 322 is necessarily spinning because the spindle is part of the motor. Such spinning engages blades within the blender to cause the blender to operate, such as crushing ice or blending multiple components of drinks together.

Some embodiments include a lock-out, such as a reed switch or hall-effect sensor within the blender recess 320 to prevent the motor 344 from energizing unless the base of the blender is properly positioned within the blender recess. In these embodiments the lock-out prevents operation of the motor 334, regardless of the operation of the switch 330 if the blender jar is not seated within the blender recess. In operation, a reed switch or hall-effect sensor changes states based on the presence of a magnet mounted to or within the jar of the blender. In the case of the reed switch, a metal reed is attracted to the magnet and physically makes electrical contact with another part of the switch to close the lock-out circuit, which allows electrical current to flow. In the case of the hall-effect sensor, the sensor is structured to detect the presence of the magnetic field caused by the magnet, and change states, such as an output voltage, based on the presence or absence of the magnetic field. Detection of the changed state allows the lock-out switch to determine whether the blender is properly positioned in the blender recess 320.

Other embodiments the lock-out may prevent operation of the motor 344 unless the blender jar is rotated after being positioned within the blender recess 320. In yet other embodiments the lock-out may prevent operation of the motor 344 unless the blender jar is physically being pressed into the blender recess 320 while the switch 330 is simultaneously depressed. In such an embodiment the switch 330 need not be a two-part switch, because manipulation of the blender jar has the effect of providing one of the two-parts of the safety switch 330.

The motor 334 is preferably a DC motor operating between 12 and 24 volts and is preferably an 18-19.2 volt motor. In one embodiment the motor 334 is an 18 volt DC motor having a no-load speed of greater than 5000 RPM, with a no-load current draw of less than 15 Amps. Of course the motor specifications may be based on final implementation and may widely vary.

In some embodiments the motor 334 may be a brushless direct-drive motor and include a motor controller (not illustrated) coupled to the motor 334 and operable to control the rotational speed and power draw of the motor. The motor controller may be a programmed circuit, located on, for example, a programmed chip on a printed circuit board, and electrically connected to the motor. In other embodiments the motor controller may be an Application Specific Integrated Circuit. The motor controller may be programmed or implemented to include multiple timing stages. For instance the motor controller may operate in a first stage to cause the motor 334 to operate at a first speed and power level to initially crush ice contained within the blender. Next the motor controller may operate in a second stage to increase the blade speed from the first stage to a moderate stage for an initial blending stage. Finally the motor controller may operate in a third stage to further increase the blade speed for a final blending stage so that the contents of the blender are blended to a desired level. The motor controller may be pre-programmed or the stages may be directly controlled by the user. In such an user-controlled embodiment, the user would press the switch 330 once for stage one, twice in succession for stage two, and three times in succession for stage three, or some other combination. In another embodiment the user could keep the switch 330 depressed and the motor controller could automatically step through all three stages. In some embodiments the motor controller could use Pulse Width Modulation to limit the current drawn from the battery 352 to the motor 334 during operation. For example the motor controller could use pulses having a particular operational pulse width and power cycle for each stage of motor operation. In other embodiments the motor controller could drive the motor 334 through more than 3 stages.

In an exemplary embodiment a first, startup stage operates for less than 1 second. The startup stage rotates the motor from 0 to an approximate first RPM. In the same exemplary embodiment, an ice-crushing, second stage spins the motor between approximately the first RPM and approximately a second RPM that is faster than the first RPM. The second stage may last for between 1 and 20 seconds, for example. In the same embodiment, a blending, third stage operates between approximately the second RPM and a third RPM that is faster than the second RPM. The third stage may last for between 5 and 20 seconds, for example.

FIGS. 7B and 7C illustrate other structures and methods to transfer the rotational energy of the spinning motor 334 to the rotating spindle 322, such as through various transmissions. For example FIG. 7B illustrates a pulley and belt system where the motor 334 includes a first pulley that is mechanically connected to a second pulley 337 through a belt 338. The belt may be a toothed belt, a solid belt, or another type of belt. In some embodiments a chain may connect the pulleys 337, 339. The second pulley 337 is directly coupled to the spindle 322. In operation, when the motor 334 spins, this causes the first pulley to spin, which in turn causes the belt 338 to cause the second pulley 337 to spin and turn the spindle 322. This, in turn, drives the blender. By adjusting the relative sizes of the pulleys 337, 339, the power ratio and speed ratio of the motor 334 to spindle 322 may likewise be adjusted. In other words, a smaller second pulley 337 drives the spindle 322 at a lower speed but has more power, while a larger second pulley 337 sacrifices power for additional rotational speed of the spindle 322.

The embodiment illustrated in FIG. 7C includes a gearbox 336 that likewise may be used to adjust a power and speed ratio of the motor 334 to the spindle 322. The power and speed of the gearbox 336 may be adjusted by specifying the relatively number of gears connected to the input and output shafts. The gearbox 336 of this embodiment also changes the rotational direction of the internal spinning shafts. In other words, the gearbox 336 accepts a motor shaft having a horizontal orientation and has an output shaft in the vertical orientation. The gearing of either the embodiments illustrated in FIG. 7B or 7C may be selected to provide suitable torque and RPMs to sufficiently blend drinks, crush ice and puree smoothies to their desired consistencies.

The motor 334 may be retained within the second lid 330 in a number of ways. For instance, the motor 334 may be mechanically attached by screws or adhesives. The motor 334 may instead be clamped using a clamping unit (not illustrated), so that the motor unit may be removed for repair or replacement.

The battery 352 provides power to the motor unit 334. In the preferred embodiment the battery 352 is rechargeable. In some embodiments the battery is removed from the second lid 300 by opening the cover 350 and recharged in a separate recharging device. Then the battery 352 is replaced in the lid 300 when the battery is fully charged. In these embodiments the second lid includes no charging capability. In other embodiments, the second lid 300 may be connectable to a conventional electrical outlet, car battery, solar panel, or other charging source to charge the battery while the battery is within the lid 300. In such an embodiment the lid 300 may include an internal charging port (not illustrated), which, similar to the external charging port 390 illustrated above in FIG. 6C, may include a waterproof cover for protection. Such an embodiment may not be desirable due to the extra heat generated by charging the battery and the extra complexity of including a battery charging circuit within the lid 300.

In some embodiments the battery 352 is a rechargeable 10-cell lithium-Ion battery pack including two-parallel sets of five lithium-Ion cells in series. Since each Lithium-Ion cell outputs approximately 3.6 volts, the five cells in series outputs approximately 18 volts, which matches the operating voltage of the motor. Including ten cells in the battery pack, i.e., two parallel sets of five cells, gives a total capacity of approximately 1500-4000 mAh. Of course other combinations of cells in the battery 352, such as more or fewer cells, or having the cells connected in a different configurations, is possible to match a desired output voltage and storage capacity for the battery 352. In other embodiments the battery 352 may be made of different materials other than lithium-Ion, such as lead-acid, nickel cadmium, nickel metal hydride, or lithium ion polymer, for example.

Figure 8B:
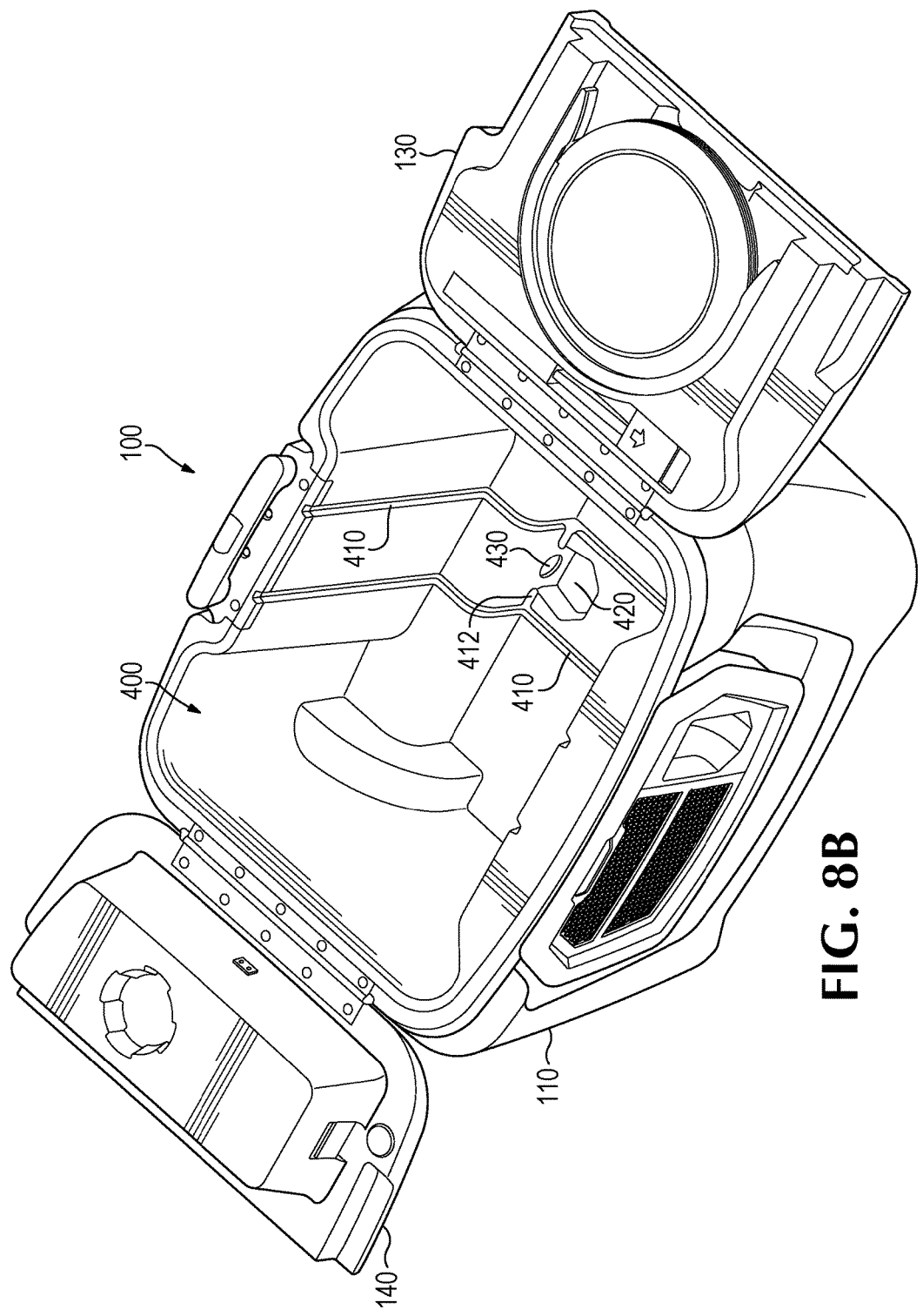

FIGS. 8A and 8B are a top view and perspective view illustrating an interior space or storage space 400 of the cooler 100 illustrated in FIGS. 1A and 1B according to embodiments of the invention. FIG. 8C is a perspective view of the interior space illustrated in FIGS. 8A and 8B further including illustration of an integrated cutting board according to embodiments of the invention. FIG. 8D is a perspective view of the interior space illustrated in FIGS. 8A and 8B showing additional detail according to embodiments of the invention.

As described above, the storage space 400 is used to keep items cool in the cooler 100. In some embodiments, retaining grooves or slots 410 are formed into the interior shell of the cooler 100. As illustrated in FIG. 8C., these slots 410 are structured to accept a divider 440 to divide the storage space 400 of the cooler 100 into separate spaces. For example one section of the storage space 400 could be used to hold clean ice for the blender, while another section of the storage space could hold drinks surrounded by additional ice. By including two slots 410 in the cooler 100, the storage space 400 could be divided yet again to provide three separate spaces within the storage space. The third storage space could be used to store dry items, i.e., items that are intended to be kept cool but that the user may not want to directly contact ice.

Although illustrated in these figures as having two separate slots 410, embodiments could include as many or as few slots 410 as desired.

One or more removable dividers 440 could be inserted into the respective slots. In some embodiments the dividers 440 may serve additional functions. For example the divider 440 may be used as a cutting board for slicing fruit.

The slots 410, as illustrated in FIG. 8A, include a front and a rear vertical section formed in the sides of the cooler 100, as well as a generally horizontal section formed in the bottom surface of the cooler. Having slots on three sides provides stability to the removable divider 440 to retain it in place.

The generally horizontal slots 410 are coupled to slot extensions 412, which further extend to an internal drain cup 420. The horizontal slots 410, in addition to providing mechanical stability to retain the removable dividers 440, also provide a channel to guide melting ice, i.e., water, or other fluids in the bottom of the interior space 400 to the slot extensions 412, which further allows the fluids to gather in the internal drain cup 420. In some embodiments the horizontal slots 410 and slot extensions 412 are approximately 0.25 inches deep, and 0.25 inches wide, and sloped toward the drain cup to facilitate flow toward the drain cup 420. In some embodiments the drain cup 420 is approximately 2-4 inches in diameter, and approximately 1-3 inches deep. Preferably the drain cup 420 is approximately 3 inches in diameter and 2 inches deep. The drain cup 420 may be circular or polyangular as illustrated. Additional detail is illustrated in FIG. 8D.

A drain hole 430 extends from the drain cup 420 through the outer surface of the cooler 100. The drain hole 430 is relatively large, such as 0.75-1.5 inches in diameter to facilitate rapid discharge of water collected in the drain cup 420. The drain hole 430 may have a removable or retained cap or other mechanism to allow selective opening. In other words, the user may close the cap or otherwise close the opening to the drain hole 430 and allow water to accumulate in the drain cup 420, or may open the cap or otherwise open access to the drain hole to allow the water or other fluids to drain from the drain cup. The drain hole 430 may further include a screen, mesh or some other retaining structure to simultaneously allow liquid to flow through while retaining any solids, such as small ice cubes, to be retained within the storage space 400 of the cooler 100.

Figure 9A:
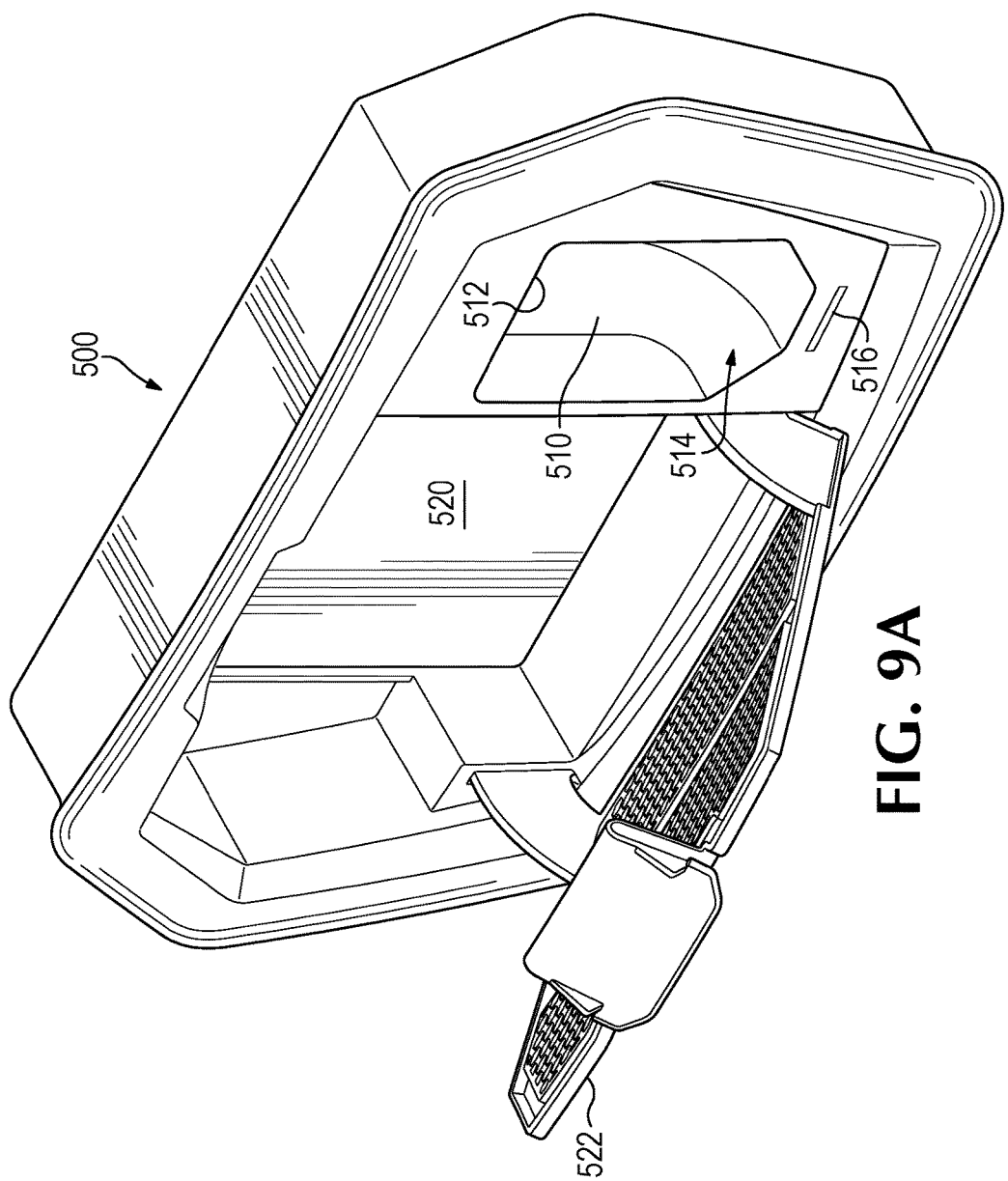
Figure 9B:
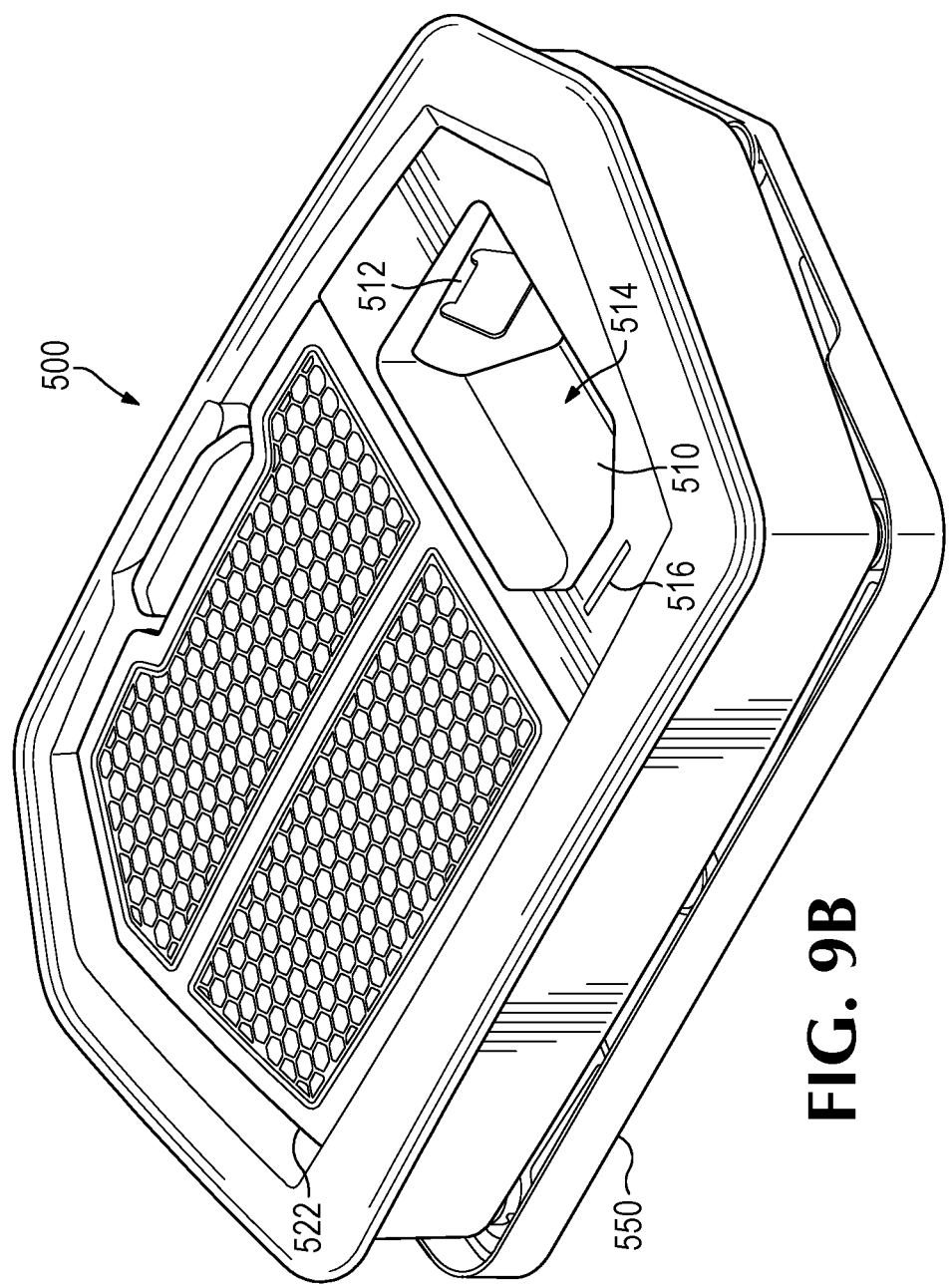

FIGS. 9A, 9B, and 9C are perspective views of an accessory storage unit 500 built in or attached to the cooler illustrated in FIGS. 1A and 1B. In some embodiments the storage unit 500 may be attached to the front surface of the cooler 100, as illustrated in FIGS. 1A and 1B, although the storage unit 500 may be attached or coupled to the sides or back of the cooler 100. In another embodiment the storage unit 500 may be attached to one or integrated into one or more of the lids 130, 140.

With reference to FIGS. 9A, 9B, and 9C, the storage unit 500 includes a bottle opener section 510 as well as a covered portion 520. The covered portion 520 is covered by a movable lid 522, illustrated in FIG. 9B. The bottle opener section 510 includes a bottle opener 512 as well as a cap collection area 514. The bottle opener may be formed of bent or formed metal and sized and shaped to facilitate opening standard crown-capped bottles. After opening, the crown cap is retained within the cap collection area 514. The cap collection area may include a magnet within or impregnated within plastic to retain the crown caps after removal. A slot 516 allows any liquids collected in the cap collection area 514 to drain. In other embodiments, the function of the slot 516 may be performed by an integrated discharge tube that routes collected liquid from the storage unit 500. In some embodiments the discharge tube may discharge directly into the storage space 400 of the cooler 100. In other embodiments the discharge tube may discharge directly into the drain cup 420 illustrated in FIGS. 8A, 8B, 8C, and 8D. In yet other embodiments the discharge tube may discharge liquids to the ground.

The covered portion 520 of the storage unit 500 may be used to retain any item desired to be retained with the cooler 100, such as keys, phones, sunglasses, wallets, etc. In a preferred embodiment the covered portion stores a music player as well as a music source, such as an MP3 player or a smartphone. In yet another preferred embodiment the covered portion 520 is sized to exactly retain an integrated, removable music player that is described in more detail below. The covered portion 520 of the storage unit 500 may be approximately 5-15 inches wide and 5-15 inches tall. Preferably the covered portion is approximately 10 inches wide and approximately 8 inches tall.

An integrated music player is sized and shaped to be removably stored within the covered portion 520. Preferably the music player is a self-contained, self-powered, music player that includes an audio input, an amplifier, and one or more speakers. The audio input may be a wired or a wireless input, or the music player may include both types of audio inputs. In a preferred embodiment the music player may be an audio player, such as an MP3 player, that may wirelessly connect to the audio source using the Bluetooth or DLNA audio standards. The audio source may be a phone, MP3 player or other audio source, for example. The music player is preferably self-powered and includes a rechargeable battery that is charged using a separate charging device. In some embodiments the music player may be powered from the battery 352 illustrated in FIGS. 7A, 7B, and 7C. The music player may be retained within the covered portion 520 using clips, latches, and/or straps. In other embodiments the music player is covered in pliable foam and is sized to press-fit within the covered portion 520 for easy insertion and removal. In other embodiments, the music player may not be stored within the covered portion 520, but may instead be stored within either the first lid 130 or second lid 140, depending on implementation.

The covered portion 520 is accessible by operation of a cover lid 522. The cover lid 522 may be hinged, as illustrated, or may be held into place using other methods, such as magnets, snaps, or latches.

FIG. 9C. is a rear perspective view of the storage unit 500. A rear support 550 is illustrated. The rear support 550 is used during manufacturing of the cooler 100 to provide attachment points for the storage unit 500. The storage unit 500 may be attached through the outside body of the cooler 100 and into the rear support by a retaining mechanism such as screws. In some embodiments the storage unit may additionally be held in place with adhesives or using other methods. As illustrated in FIG. 9C, the storage unit has depth, approximately 1-3 inches, to provide storage area within the covered portion 520. As described below, this depth also creates an attachment point for a gear tie-down.

Figure 10A:
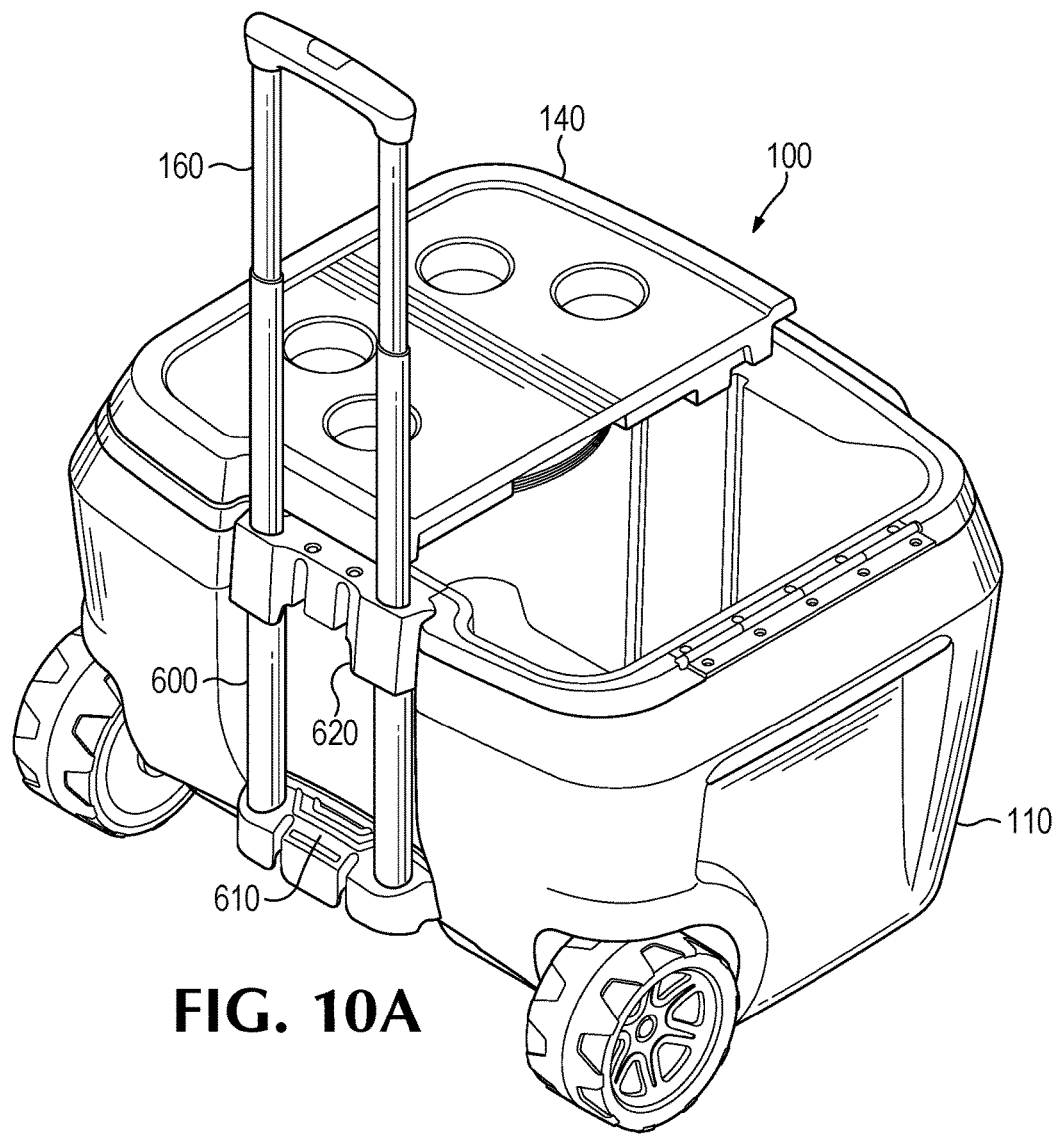
FIGS. 10A, 10B, and 10C are perspective views illustrating a handle 600 integrated into the cooler illustrated in FIGS. 1A and 1B according to embodiments of the invention.
Figure 10B:
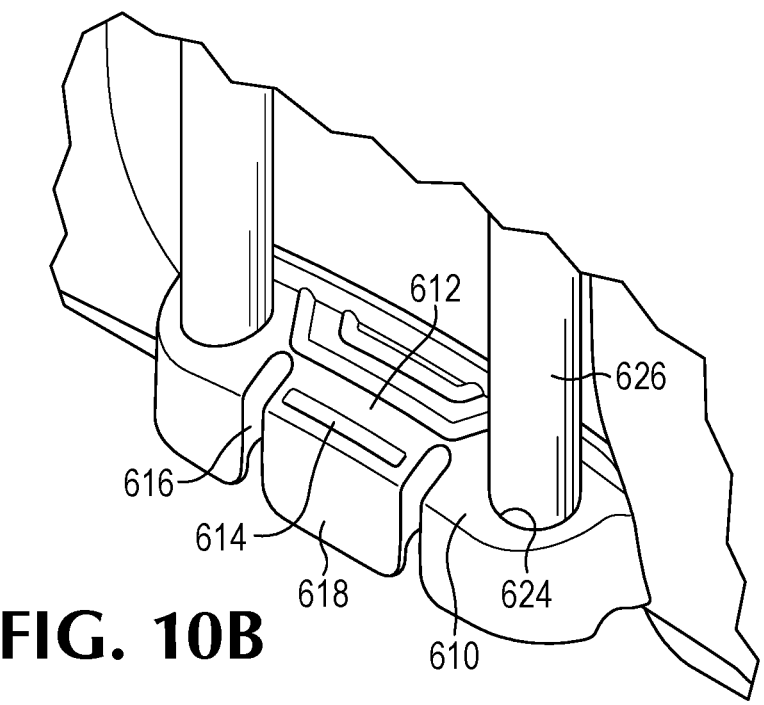
Figure 10C:
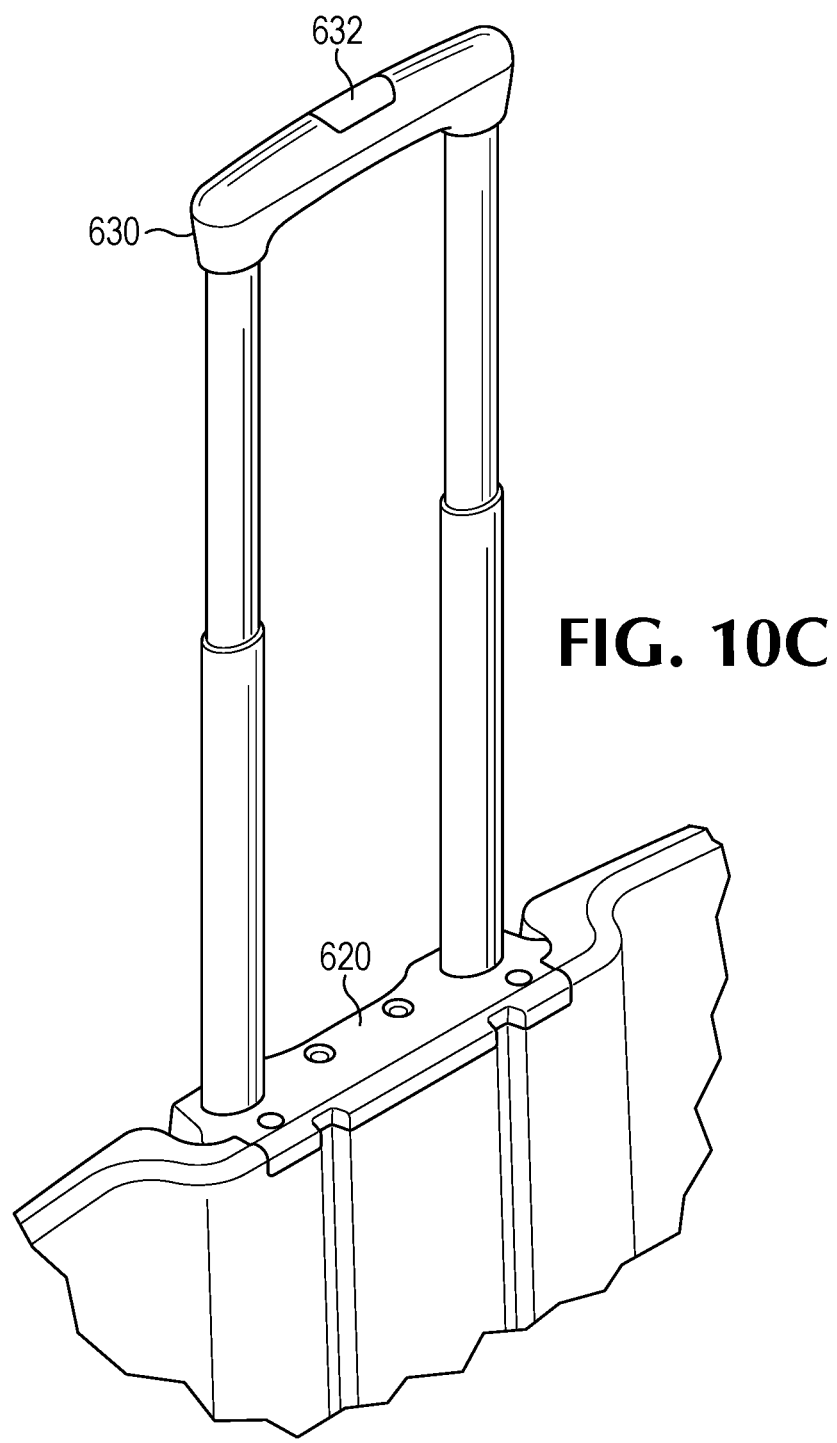

FIGS. 10A, 10B, and 10C are perspective views illustrating a handle 600 integrated into the cooler illustrated in FIGS. 1A and 1B according to embodiments of the invention. In the illustrated embodiment, the handle 600 includes a lower attachment area 610, an upper attachment area 620, and a top grip area 630.

The lower attachment area 610 is illustrated in detail in FIG. 10B. The lower attachment area includes apertures 624 for receiving one or more poles 626. The lower attachment area 610 is held to the body of the cooler 100 by screws or adhesives, or by both screws and adhesives as has been described above with reference to other attachment methods. The lower attachment area 610 includes a platform 612 sized and shaped to accept a foot placed thereon. In operation, a user can step on the platform 612 to provide leverage while pulling back on the handle 600 to tip the cooler so that it is resting on the wheels and ready for travel. The platform 612 may be integrated or affixed to the lower attachment area. The platform 612 may additionally include treads 614 to increase friction and to hold the foot in place during the tipping operation. The lower attachment area further includes slots 616 and an overhang 618 described with reference to the gear storage system illustrated and described below.

Referring back to FIGS. 10A and 10C, the upper attachment area 620 may be directly attached to a top lip of the cooler, as illustrated in FIG. 10C. Such an attachment method provides a strong attachment system to withstand the forces caused that using the handle 600 may invoke. A top grip area 630 includes a release button 630 to allow the handle 600 to be extended or retracted in a telescoping manner. In other words, the poles making up the handle 600 may slide within one another to reduce area when the handle is not needed.

Figure 11A:
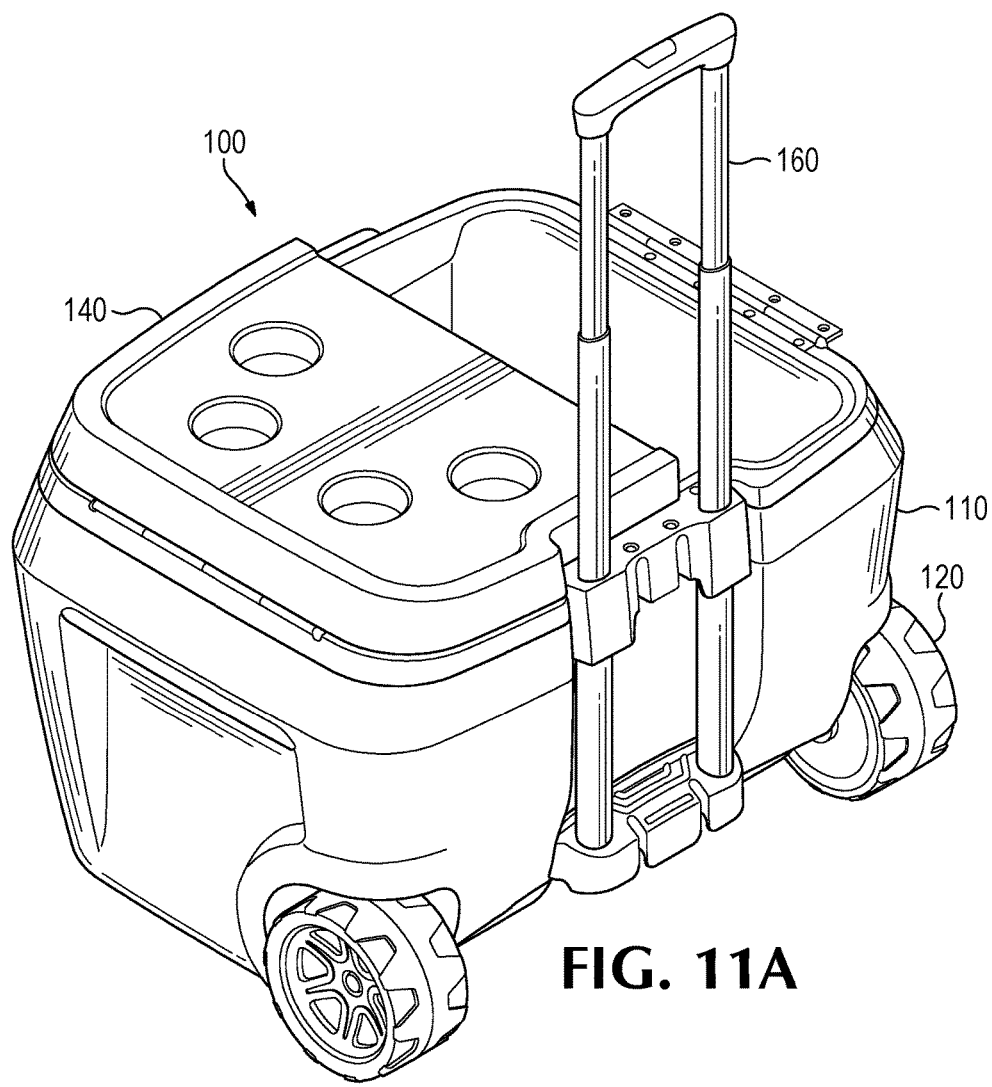
FIGS. 11A and 11B are perspective diagrams illustrating an external shape of a rear portion of the cooler illustrated in FIGS. 1A and 1B according to embodiments of the invention.
Figure 11B:
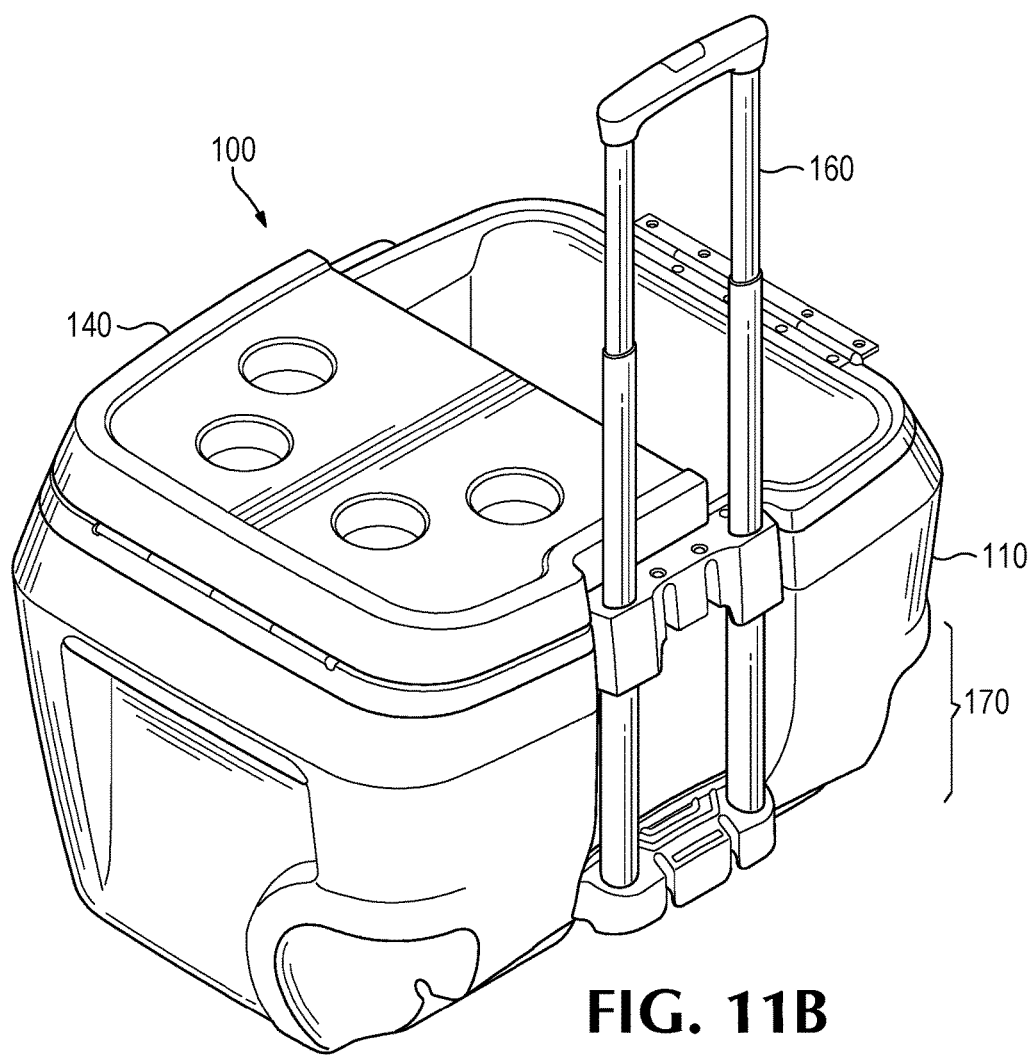
Figure 11C:
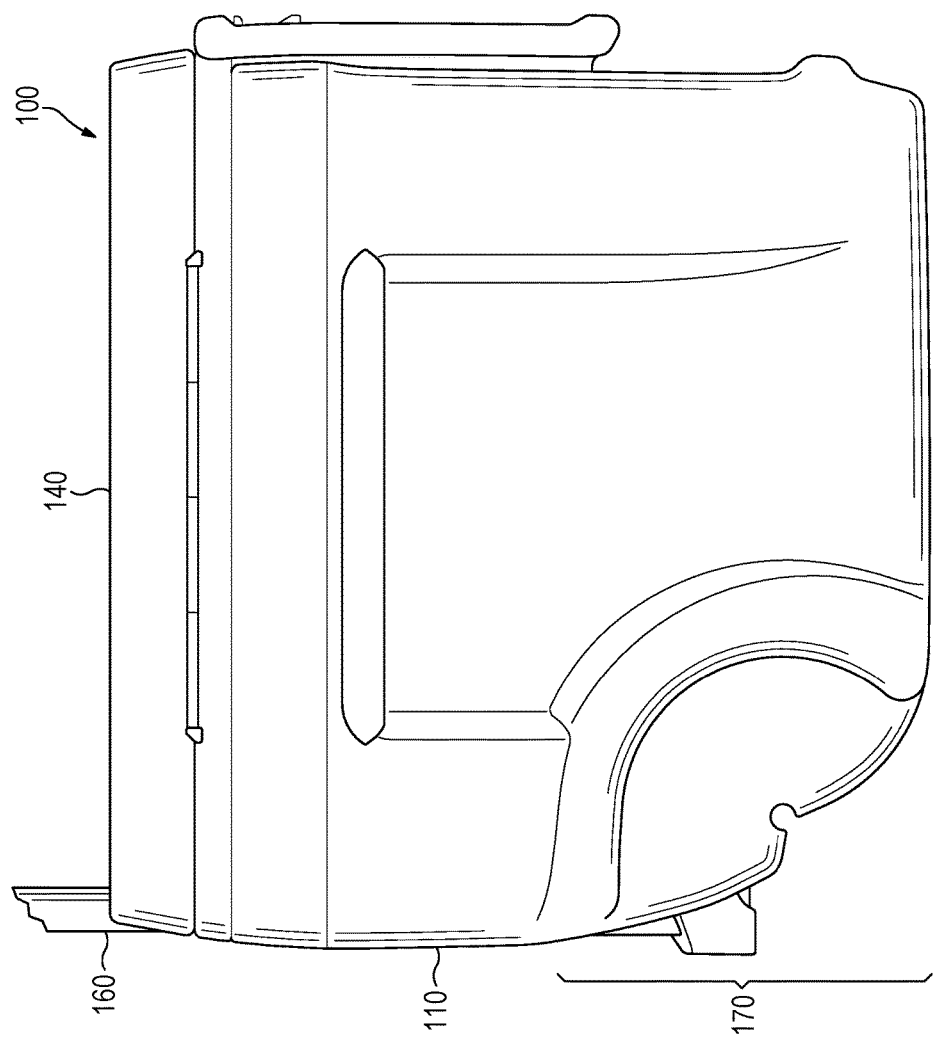
FIG. 11C is a side view diagram illustrating the same.

FIGS. 11A and 11B are perspective diagrams illustrating an external shape of a rear portion of the cooler illustrated in FIGS. 1A and 1B, and FIG. 11C is a side view diagram illustrating the same.

As described above, the cooler 100 is preferable rectangular in shape. Conventional coolers have a problem, however, in that they tend to drag across soft surfaces, such as sand, tall grass, or the forest floor. Even conventional coolers including wheels have this dragging action because of the outer shape of the conventional cooler, which tends to dig into the soft surface. Embodiments of the invention address this problem by including a sliding portion 170 of a rear surface of the cooler 100 to accommodate such operational conditions. More specifically, the sliding portion 170 is shaped, formed, or otherwise implemented to cause the cooler 100 to follow the contour of a soft surface over which the cooler 100 is traveling. For example, if the cooler 100 as illustrated in FIG. 11A is being pulled through sand, even the relatively large wheels of the cooler 100 may tend to sink in the sand. Conventional coolers plow the sand with a rigid and sharply shaped rear-bottom edge. The cooler 100 according to embodiments of the invention, however, include a sliding portion 170 integrated into the form factor of the rear and bottom surfaces of the cooler 100. With reference to FIGS. 11B and 11C, the illustrated embodiment includes no sharp edges that tend to plow into soft surfaces. Instead, the sliding portion 170 of the cooler 100 is shaped to cause the cooler to more easily slide over the soft surface. Although the sliding portion 170 is illustrated here as having a curved surface having a radius that is smaller than a radius of the wheels 120, the sliding portion 170 may take other shapes. For instance the sliding portion 170 may be a relatively flat angle. In some embodiments the curved portion of the rear of the cooler may start approximately one-third to one-half from a depth of the cooler, and continue to approximately one-third to one-half of the height of the cooler. Such a structure is illustrated particularly well by FIG. 11C. In other embodiments an angled portion may start approximately one-third from a depth of the cooler and continue to approximately one-third of the height of the cooler. In one embodiment (not illustrated), the sliding portion 170 is relatively planer and has an angle of approximately 45° relative to the bottom surface and/or a rear surface of the cooler 100. The sliding portion 170 is shaped to provide additional clearance to the bottom edge of the cooler 100 when the cooler 100 is tipped backwards. In some embodiments the sliding portion 170 is shaped to provide maximum clearance between a rear surface of the cooler 100 when the cooler is tipped backwards between approximately 30-60 degrees, and preferably when the cooler is tipped backwards at approximately 45 degrees.

Figure 12A:
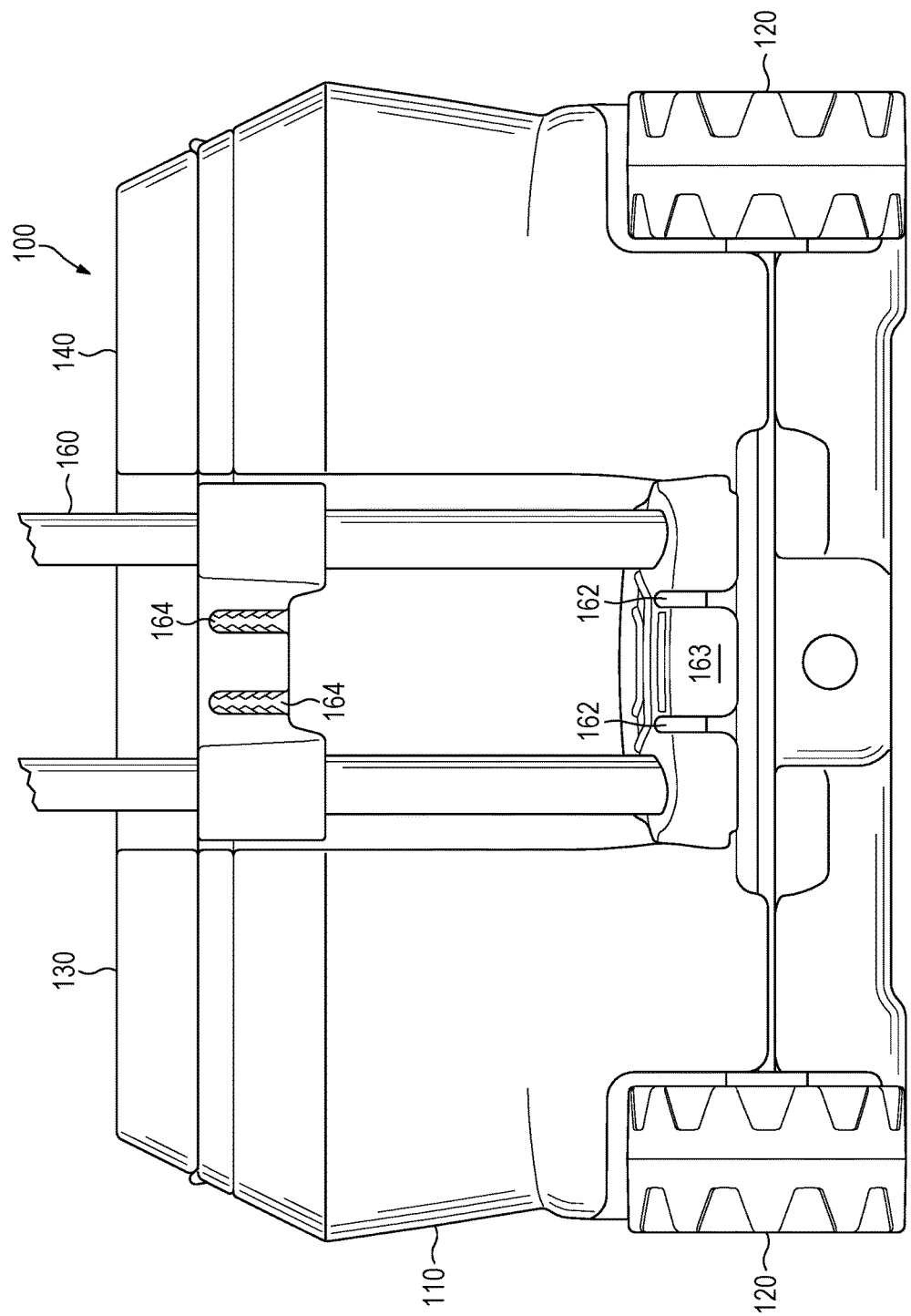
FIGS. 12A and 12B are rear views of the cooler 100 illustrated in FIGS. 1A and 1B according to embodiments of the invention.

FIG. 12A is a rear view of the cooler 100 illustrated in FIGS. 1A and 1B. As described above, the cooler 100 includes one or more wheels 120. The wheels may be formed of strong plastic or rubber, for example. As illustrated in FIGS. 11A, 11B, 11C, and FIG. 12A, the body of the cooler may be specifically shaped to provide relief for the wheels. In other words, the body of the cooler 100 is cut in to accept the wheel mounts so that the wheels 120 do not extend beyond the lateral edges of the cooler. In addition, a width of the wheels is chosen to be quite wide relative to standard wheels. Selection of wider wheels allows the wheels to better support the cooler when traveling over soft surfaces, so that the weight of the cooler does not drive the wheels into the soft surface. In one embodiment, the overall cooler width is approximately 25 inches wide, while each of the wheels 120 has a width of approximately 2.5-4 inches, and preferably approximately 3 inches. The width of the wheels 120 may scale as the width of the cooler changes so as to keep the same approximate wheel-width to cooler-width ratio. In one embodiment each wheel has a diameter of approximately 3-8 inches, and preferably 6 inches.

Figure 13A:
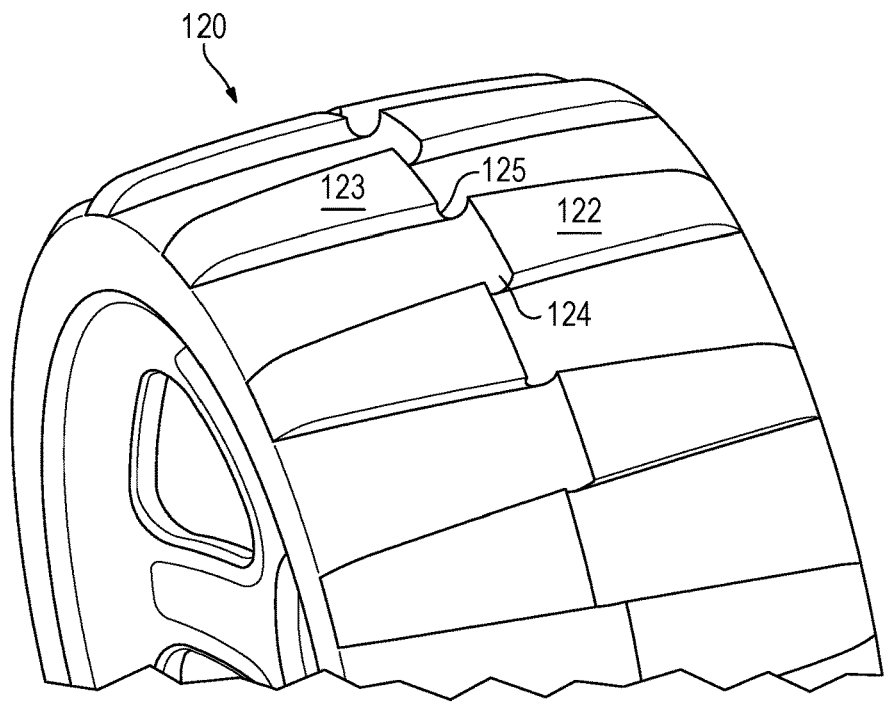
FIGS. 13A and 13B illustrate additional features of the wheels that may be attached to the cooler of FIGS. 1A and 1B.
Figure 13B:
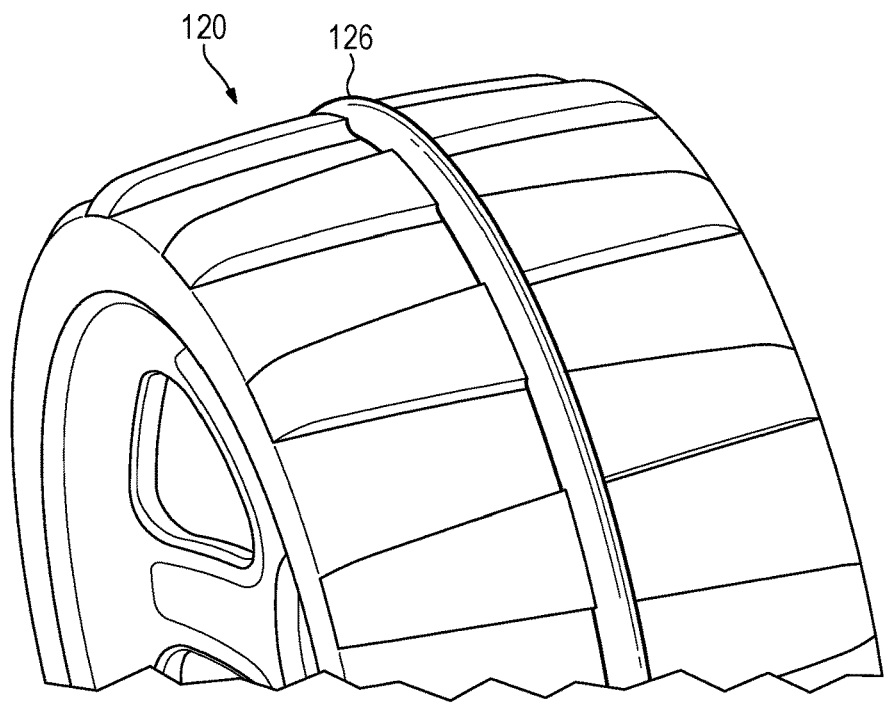

FIGS. 13A and 13B illustrate additional features of the wheels that may be attached to the cooler of FIGS. 1A and 1B according to embodiments of the invention. In this embodiment the wheels 120 include alternating lands 122, 123. A groove is formed by forming recesses 124, 125, respectively in the alternating lands 122, 124. When multiple recesses 124, 125 are formed together, the groove is formed. As illustrated in FIG. 13B, an O-ring 126 may be disposed within the groove, and held in place by the alternating recesses 124, 125. The O-ring may be formed of rubber or other pliable material that is softer than the material forming the wheels 120. The combination of the harder material for the wheels 120 with the softer material for the O-ring functions to absorb noise caused when the cooler 100 is rolled on a hard, relatively rough surface, such as concrete or asphalt. Additionally, the O-ring 126 may be replaced without requiring replacement of the entire wheels 120. In some embodiments the O-ring 126 has a diameter of between 0.01 and 0.5 inches. In other embodiments the O-ring may be an internal component of a much wider soft cover for wheels. In other words, such a wheel cover may have a width of 1-2 inches wide on the exterior surface, with an internal O-ring to keep the wheel cover in position on the wheel 120.

Figure 12B:
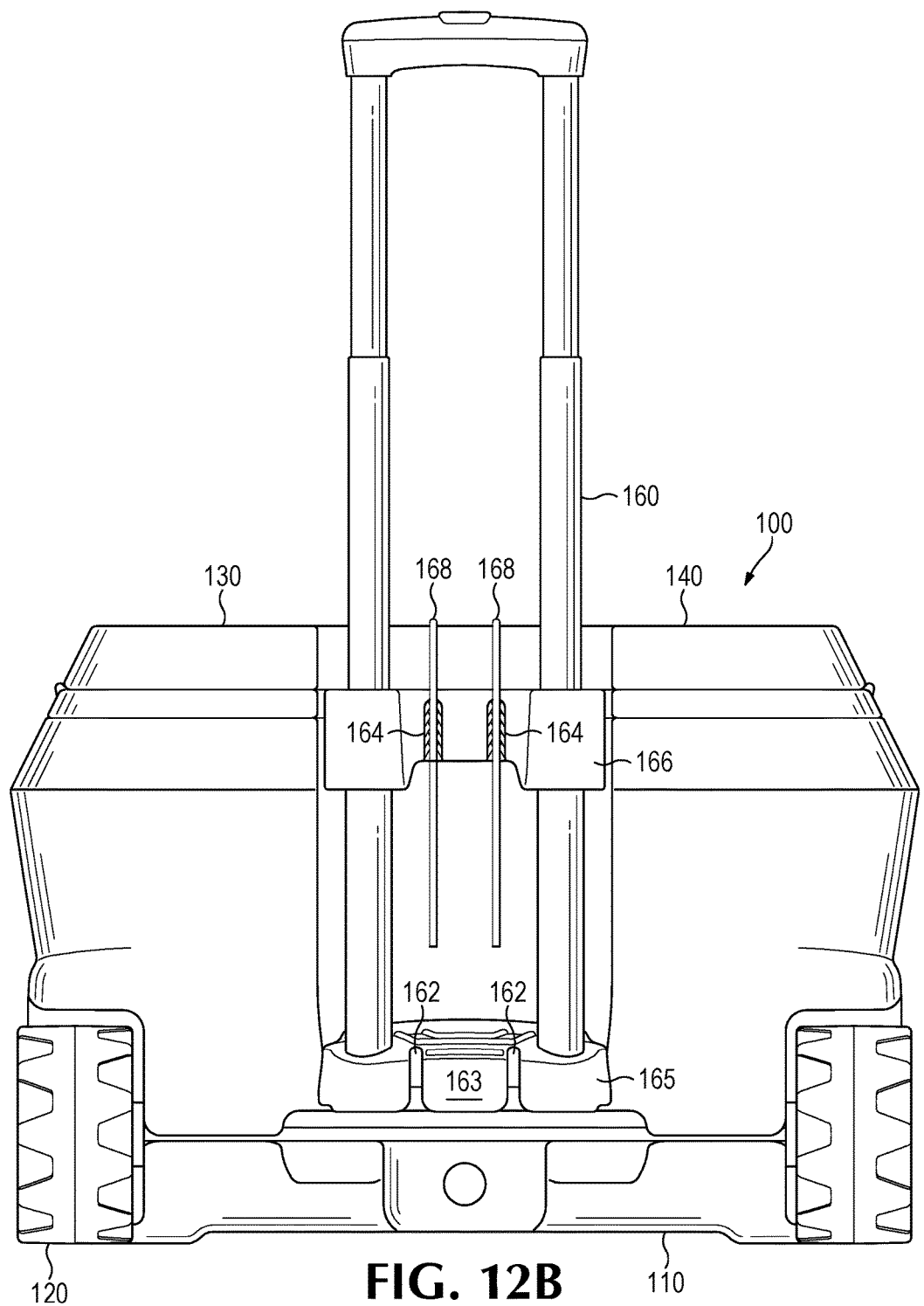

Another feature of the cooler according to embodiments of the invention is an integrated tie-down system, illustrated best with reference to FIGS. 12A, 12B, and FIG. 1B. Embodiments of the invention include an integrated tie-down system, which incorporates pieces of the handle 160 as well as the storage unit 500. The tie down system includes a cord 168 illustrated in FIG. 12B. The cord 168 is preferably a dynamic, i.e., stretchable, cord, but could be a static line as well. Examples of material for the cord 168 include elastic or nylon rubber.

The cooler 100 is structured to store the cord 168 when not in use, but is also structured to allow the cord 168 to be extended to secure gear placed on the cooler when convenient. Examples of gear placed on the cooler may include, for example, folding chairs, sporting equipment, blankets, etc. When a user wishes to use secure such items on the cooler 100, the cord 168 may be extended over the items and secured to an underlip 152 of the storage unit 500, illustrated best in FIG. 1B. In other words, the end loop of the cord 168 is looped over the gear to be stored and underneath the underlip 152 of the storage unit 500, which retains that portion of the cord 168. Other embodiments may include different attachment mechanisms, such as hooks, loops, and underlips located on other surfaces, such as on one or more of the lids or elsewhere on the cooler body, for example. Then, the user can tighten the cord 168 by pulling excess cord 168 slack through one or both clam cleats 164 as illustrated in FIG. 12B. The clam cleats 164 frictionally hold the cord 168 in place until released. Such release is accomplished by pulling the cord 168 laterally away from the clam cleats 164. In addition or instead of clam cleats, the cord 168 may be tightened and/or retained in any of a number of ways, such as by using clips, latches, knobs, clamps, other types of mechanical interference or other methods to retain the tie-down cord 168.

In some embodiments excess cord 168 may be threaded through slots 162, illustrated in FIGS. 12A and 12B, and retained by cord lip 163 formed in the lower attachment area of the handle 160.

When not in use, the cord 168 may be wrapped around the outside of both the lower attachment area 165 and upper attachment area 166 of the handle 160, and may be retained by an undercut underneath the lower attachment area 165 of the handle 160.

Figure 14:
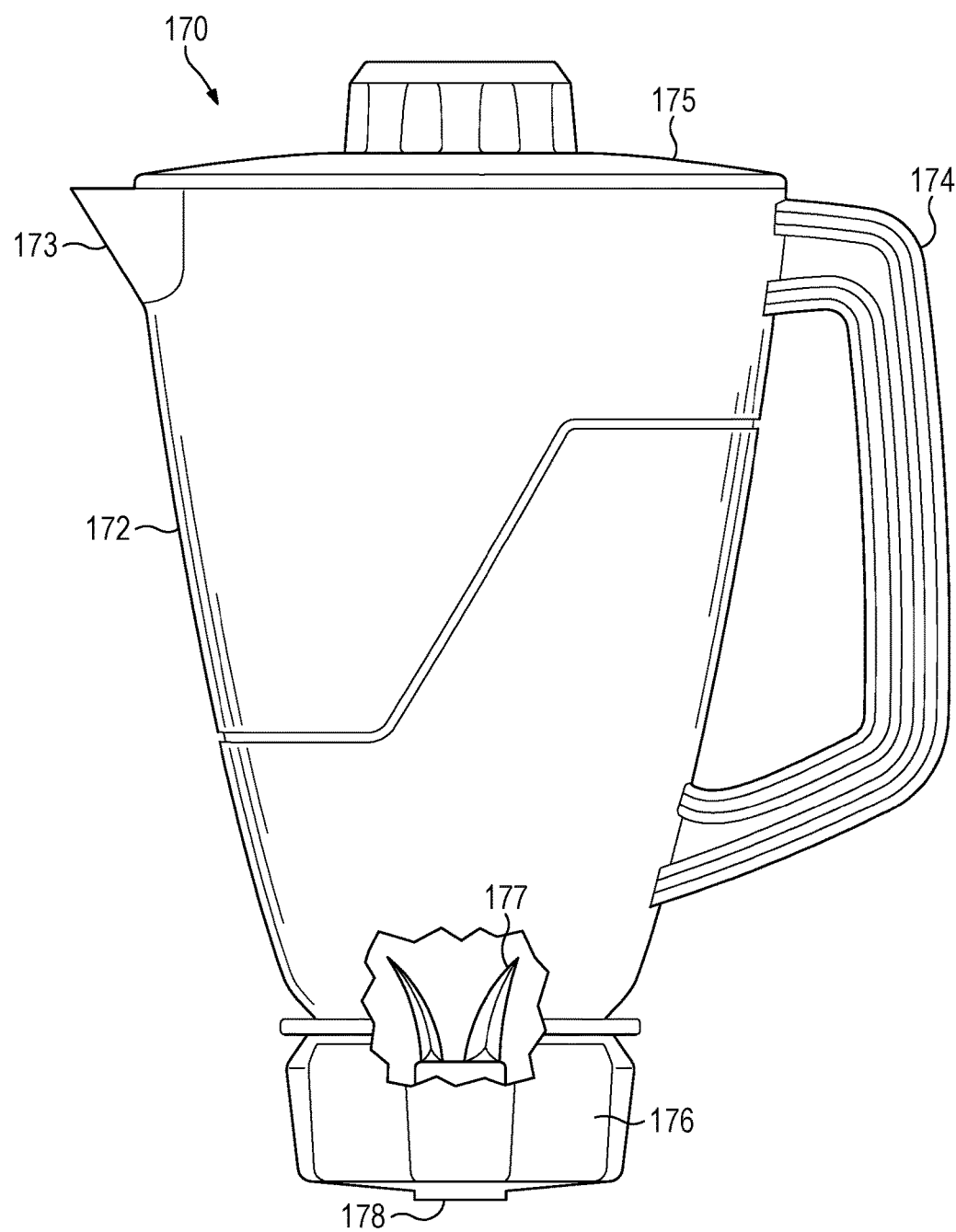
FIG. 14 is a side view of an example blender for use with the cooler 100 illustrated in FIGS. 1A and 1B according to embodiments of the invention.

FIG. 14 is a side view of an example blender jar and associated parts for use with the cooler 100 described with reference to FIGS. 1A and 1B. An example blender jar 170 includes a main blender jar 172, spout 173, and handle 174. The blender jar 172 may be made from food grade plastic or glass, or other suitable material. A lid 175 covers the main blender jar 172 and functions to keep items within the blender jar as they are being blended. In some embodiments the lid 175 may be sized and shaped to cover the blender recess 142 illustrated in FIG. 1B. In such an embodiment the blender lid 175 may protect the blender spindle.

A collar 176 attaches to the blender jar 172 in a typical manner, such as by engaging corresponding threads on the outside of the blender jar and inside of the collar 176. Also, the collar 176 may be used to secure a set of blades 177 within the blender jar 172 in a known manner. The collar 176 may be shaped to insert within the blender recess 142 of FIG. 1B, which engages with protuberances of the collar to prevent rotation of the blender jar 172 during blending operation. Of course, the blender recess 142 may instead be shaped to form a negative geometry of the collar 176.

A receiver 178 in the bottom of the set of blades 177 is structured to receive a blender spindle, such as the blender spindle 322 illustrated in FIG. 6A.

In operation, the blender 170 is first assembled by inserting the set of blades 177 from an open bottom of the blender jar 172. The set of blades 177 are held in place by securing the collar 176, such as by threading the collar onto the blender jar 172.

Then, to blend a drink, the contents to be blended are placed in the assembled blender jar 172, either before or after the blender jar 172 is mounted within the blender recess 142. To mount the blender jar 172 in the blender recess 142, first the receiver 178 in the bottom of the set of blades is engaged with the blender spindle, such as by rotating either the spindle or the blender jar 172 to cause the blender spindle to be inserted within the receiver. Next the blender jar 172 is positioned so that it drops into the blender recess 142. In some embodiments, positioning the blender jar 172 within the blender recess 142 satisfies the lock-out switch, thus enabling the blender 170 for use.

Next, the blender switch is actuated, which causes the motor to spin the spindle, which in turn causes the blades 177 to spin and blend the contents of the blender jar 172 into a blended drink.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention in which all terms are meant in their broadest, reasonable scope unless otherwise indicated.

Although specific embodiments of the invention have been illustrated and described for purposes if illustration, it will be understood that various modifications may be made without departing from the spirit and scope of the invention. Accordingly, the invention should not be limited except as by the appended claims.

What is claimed is:

1. A portable cooler, comprising:
   a body defining a main interior storage space, the body having an insulation compartment defined by an outer shell and an inner shell;
   a lid structured to at least partially cover the main interior storage space;
   an electric motor integrated in the lid; and
   an attachment mechanism configured to hold a blender jar in a stationary relationship with the electric motor.

2. The portable cooler of claim 1, further comprising a blender spindle integrated in the lid.

3. The portable cooler of claim 2 in which the blender spindle rotates at a maximum RPM that is faster than approximately 5000 RPM.

4. The portable cooler of claim 1, further comprising a transmission coupled between the electric motor and the blender spindle.

5. The portable cooler of claim 1, in which the blender spindle is directly driven by the electric motor.

6. The portable cooler of claim 1, in which the insulation compartment comprises an insulation material.

7. A portable cooler, comprising:
   an outer body;
   an inner body;
   an insulation interior defined by the outer body and the inner body;
   a main interior storage space defined by the inner body;
   a lid structured to at least partially cover the main interior storage space, the lid having an interior compartment;
   an electric motor disposed substantially in the interior compartment; and
   an attachment mechanism configured to hold a blender jar in a stationary relationship with the electric motor.

8. The portable cooler of claim 7, further comprising a blender spindle extending from the lid.

9. The portable cooler of claim 8 in which the blender spindle rotates at a maximum RPM that is faster than approximately 5000 RPM.

10. The portable cooler of claim 7, further comprising a transmission coupled between the electric motor and the blender spindle.

11. The portable cooler of claim 7, in which the blender spindle is directly driven by the electric motor.

12. The portable cooler of claim 7, in which the insulation compartment comprises an insulation material.

13. A portable cooler, comprising:
  a body defining a main interior storage space, the body having an insulation compartment defined by an outer shell and an inner shell;
  a lid having a first orientation structured to at least partially cover the main interior storage space, and a second orientation structured to substantially expose the main interior storage space;
  an electric motor integrated in the lid, the electric motor positioned interior to the main storage space when the lid is in the first orientation and exterior to the main storage space when the lid is in the second orientation; and
  an attachment mechanism configured to hold a blender jar in a stationary relationship with the electric motor.

14. The portable cooler of claim 13, further comprising a blender spindle integrated in the lid.

15. The portable cooler of claim 14 in which the blender spindle rotates at a maximum RPM that is faster than approximately 5000 RPM.

16. The portable cooler of claim 13, further comprising a transmission coupled between the electric motor and the blender spindle.

17. The portable cooler of claim 13, in which the blender spindle is directly driven by the electric motor.

18. The portable cooler of claim 13, in which the insulation compartment comprises an insulation material.

* * * * *